(12) United States Patent
Amano

(10) Patent No.: US 10,916,389 B2
(45) Date of Patent: Feb. 9, 2021

(54) PUSH SWITCH

(71) Applicants: CITIZEN ELECTRONICS CO., LTD., Fujiyoshida (JP); CITIZEN WATCH CO., LTD., Nishitokyo (JP)

(72) Inventor: Toyohiko Amano, Yamanashi (JP)

(73) Assignees: CITIZEN ELECTRONICS CO., LTD., Fujiyoshida (JP); CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 16/216,649

(22) Filed: Dec. 11, 2018

(65) Prior Publication Data

US 2019/0180954 A1 Jun. 13, 2019

(30) Foreign Application Priority Data

Dec. 11, 2017 (JP) .................................. 2017-236685

(51) Int. Cl.
| | |
|---|---|
| *H01H 13/14* | (2006.01) |
| *H01H 13/52* | (2006.01) |
| *H04M 1/23* | (2006.01) |
| *H01H 13/06* | (2006.01) |

(Continued)

(52) U.S. Cl.
CPC ............ *H01H 13/14* (2013.01); *H01H 13/06* (2013.01); *H01H 13/52* (2013.01); *H01H 13/86* (2013.01); *H01H 13/88* (2013.01); *H04M 1/236* (2013.01); *H01H 2205/004* (2013.01); *H01H 2207/02* (2013.01); *H01H 2223/002* (2013.01); *H01H 2225/028* (2013.01); *H01H 2229/04* (2013.01); *H01H 2231/022* (2013.01); *H01H 2231/024* (2013.01)

(58) Field of Classification Search
CPC ........ H01H 13/14; H01H 13/86; H01H 13/06; H01H 13/52; H01H 2207/02; H01H 2229/04; H01H 2223/002; H01H 2225/028; H01H 2205/004; H04M 1/236
USPC ....... 200/534, 535, 406, 520, 521, 294, 341, 200/292, 513
See application file for complete search history.

(56) References Cited

U.S. PATENT DOCUMENTS

2009/0266689 A1* 10/2009 Kikuchi .................. H01H 3/32
200/293

FOREIGN PATENT DOCUMENTS

| JP | 2004-079220 | 3/2004 |
| JP | 2016-076462 | 5/2016 |

* cited by examiner

*Primary Examiner* — Edwin A. Leon
*Assistant Examiner* — Lheiren Mae A Caroc
(74) *Attorney, Agent, or Firm* — Procopio, Cory, Hargreaves & Savitch LLP

(57) ABSTRACT

A push switch which can have a small separation distance from a side surface of a mounting board, when it is mounted on the mounting board through a step, is disclosed. The push switch includes a substrate having a first surface on which a first fixed contact point and a second fixed contact point surrounding the first fixed contact point are formed, a second surface located opposite to the first surface, a third surface extending from the second surface to a corner in a direction perpendicular to the first surface, and a fourth surface extending from the corner parallel to the first surface, and a conductive movable contact point having a peripheral edge is in contact with the second fixed contact point, and a center contacted by the first fixed contact point when the movable contact point is pressed, and the corner includes a groove recessed with respect to at least one of the third surface and the fourth surface.

7 Claims, 20 Drawing Sheets

(51) Int. Cl.
*H01H 13/86* (2006.01)
*H01H 13/88* (2006.01)

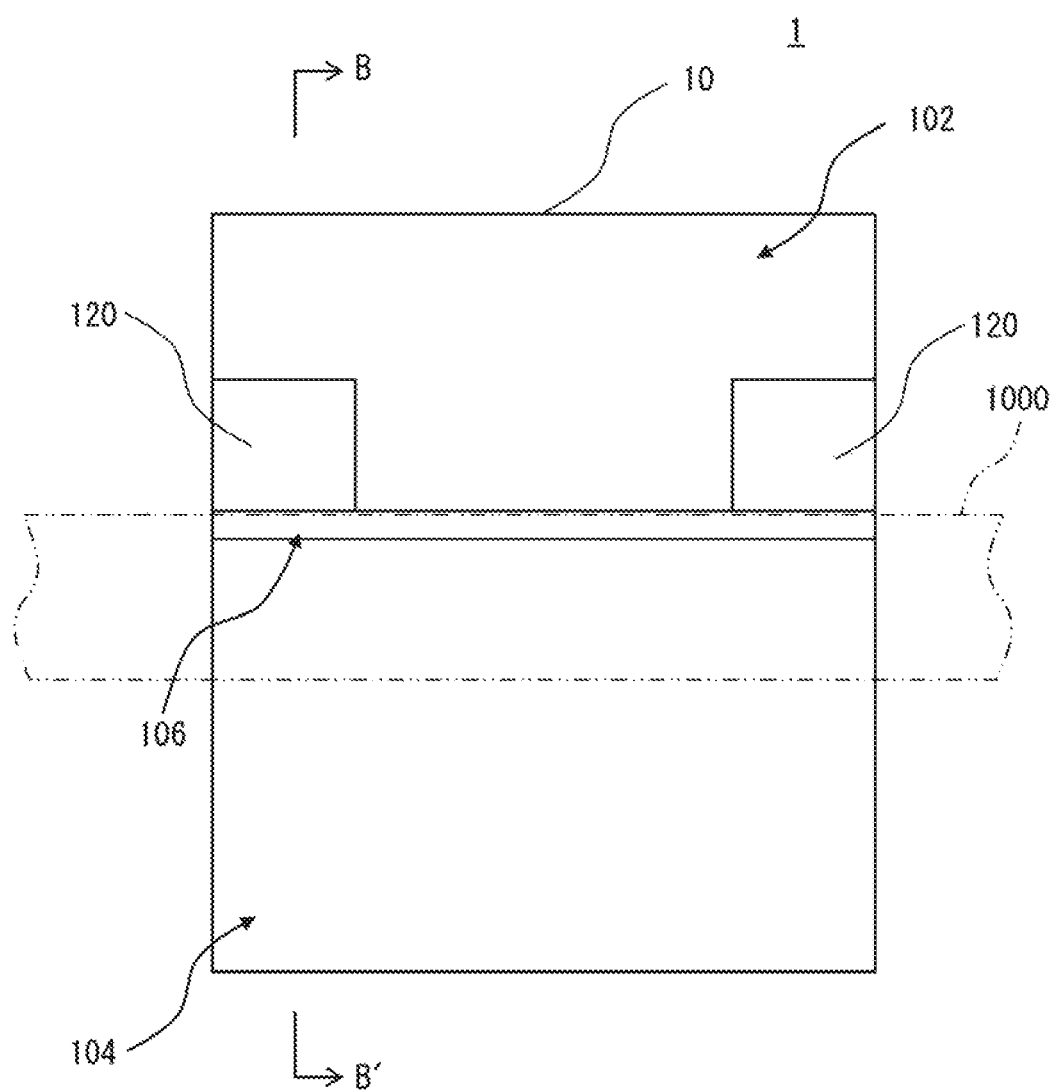

PUSH SWITCH

CROSS REFERENCE TO RELATED APPLICATION

This application claims the benefit of Japanese Patent Application JP 2017-236685, filed on Dec. 11, 2017. The entire contents of JP 2017-236685 are hereby incorporated by reference.

TECHNICAL FIELD

The present disclosure relates to a push switch suitable for, e.g., an operation button of a mobile phone.

BACKGROUND

Along with the demand for miniaturization of electronic devices such as mobile phones, it has been contemplated to reduce the mounting space of components used for such a device. Employing a push switch to be fitted at an end of a mounting board such as a circuit board as an operation button of the device can reduce the mounting space in the height direction of the mounting board.

Japanese Unexamined Patent Publication (Kokai) No. 2004-079220, for example, discloses a push switch which is formed by plate-like components such as a spacer and a substrate stacked in layers and is mourned at an end of a mounting board.

SUMMARY

The push switch disclosed in Japanese Unexamined Patent Publication (Kokai) No. 2004-079220 includes a step formed on the substrate constituting the push switch and is mounted to make the step abut against the upper surface of the mounting board.

FIG. 20 is a schematic sectional view illustrating a push switch 2000 according to the conventional technique as mounted on a mounting board.

The push switch 2000 includes a substrate 2010, a pressing member 2040, and a case 2050 and is mounted on a mounting board 1000.

The substrate 2010 includes a first surface 2011, a second surface 2012, a third surface 2013, a fourth surface 2014, and a corner 2015. The third surface 2013, the fourth surface 2014, and the corner 2015 form a step 2017 which functions as an attachment portion to be attached to the mounting board 1000 when the push switch 2000 is mounted on the mounting board 1000.

The third surface 2013 extends from the second surface 2012 to the corner 2015 in a direction perpendicular to the first surface 2011 and the second surface 2012. The fourth surface 2014 extends from the corner 2015 parallel to the first surface 2011.

The step 2017 is formed by cutting the substrate 2010 using a rotating tool. The corner 2015 located between the third surface 2013 and the fourth surface 2014 is formed by cutting the step 2017 using a rotating tool and therefore has a rounded (R) shape.

The case 2050 movably supports the pressing member 2040 in its opening. When the pressing member 2040 is depressed in the direction indicated by an arrow X, the push switch 2000 is turned on. When the pressing member 2040 is not depressed, the push switch 2000 is OFF.

When the push switch 2000 is mounted on the mounting board 1000, the third surface 2013 comes into contact with a front surface 1001 of the mounting board 1000, and the fourth surface 2014 faces a side surface 1002 of the mounting board 1000.

In the push switch 2000, the corner 2015 is formed into an R shape. With this arrangement, when the push switch 2000 is mounted on the mounting board 1000, the fourth surface 2014 of the push switch 2000 and the side surface 1002 of the mounting board 1000 do not come into contact with each other, but they are spaced apart from each other by a separation distance $d_g$. It is, therefore, difficult to appropriately transmit a pressing force applied to the push switch 2000 upon depression to the mounting board 1000.

It is an object of the present disclosure to provide a push switch which can have a small separation distance from a side surface of a mounting board, when it is mounted on the mounting board through a step.

To achieve the above-described object, a push switch according to an embodiment includes a substrate having a first surface on which a first fixed contact point and a second fixed contact point surrounding the first fixed contact point are formed, a second surface located opposite to the first surface, a third surface extending from the second surface to a corner in a direction perpendicular to the first surface, and a fourth surface extending from the corner parallel to the first surface, and a conductive movable contact point having a peripheral edge of the movable contact point which is in contact with the second fixed contact point, and a center of the movable contact point contacted by the first fixed contact point when the movable contact point is pressed, wherein the corner has a groove recessed with respect to at least one of the third surface and the fourth surface.

In another aspect of the push switch according to the embodiment, the groove is preferably recessed with respect to the third surface.

In still another aspect of the push switch according to the embodiment, the groove preferably has a length from the fourth surface to the second surface larger than a depth of a recess of the groove from the third surface.

In still another aspect of the push switch according to the embodiment, the groove is preferably recessed with respect to the fourth surface.

In still another aspect of the push switch according to the embodiment, the corner preferably includes a plurality of grooves along a line of intersection between the third surface and the fourth surface.

In still another aspect of the push switch according to the embodiment, the push switch preferably further includes a recess which is formed in a region of the fourth surface spaced apart from a line of intersection between the third surface and the fourth surface by not less than a predetermined distance and is recessed with respect to the fourth surface.

A push switch according to another embodiment includes a substrate having a first surface on which a first fixed contact point and a second fixed contact point surrounding the first fixed contact point are formed, a second surface located opposite to the first surface, a third surface extending from the second surface to a corner in a direction perpendicular to the first surface, and a fourth surface extending from the corner parallel to the first surface, a conductive movable contact point having a peripheral edge of the movable contact point which is in contact with the second fixed contact point, and a center of the movable contact point contacted by the first fixed contact point when the movable contact point is pressed, and a metal member formed in a region spaced apart from a line of intersection between the third surface and the fourth surface by not less than a predetermined distance and protruding from the third surface or the fourth surface.

A push switch according to still another embodiment is provided as a push switch mountable on a mounting board, the switch including a substrate having a first surface on which a first fixed contact point and a second fixed contact point surrounding the first fixed contact point are formed, a second surface located opposite to the first surface, a third surface extending from the second surface to a corner in a direction perpendicular to the first surface, and a fourth surface extending from the corner parallel to the first surface, a conductive movable contact point having a peripheral edge of the movable contact point which is in contact with the second fixed contact point, and a center of the movable contact point contacted by the first fixed contact point when the movable contact point is pressed, and an engagement projection formed on the third surface or the fourth surface and engageable with an engagement recess formed in the mounting board.

In another aspect of the push switch according to the embodiment, a height of the engagement projection formed on the fourth surface from the fourth surface is preferably greater than a depth of the engagement recess formed in the mounting board.

In still another aspect of the push switch according to the embodiment, the engagement projection formed on the third surface is preferably located at a position having a distance from the fourth surface larger than a distance from an end mounted with the push switch on the mounting board to the engagement recess.

A push switch according to still another embodiment includes a substrate having a first surface on which a first fixed contact point and a second fixed contact point surrounding the first fixed contact point are formed, a second surface located opposite to the first surface, a third surface extending from the second surface to a corner in a direction perpendicular to the first surface, and a fourth surface extending from the corner parallel to the first surface, a conductive movable contact point having a peripheral edge of the movable contact point which is in contact with the second fixed contact point, and a center of the movable contact point contacted by the first fixed contact point when the movable contact point is pressed, and a frame in contact with the substrate on the second surface of the substrate, wherein the frame has a side surface protrusion protruding from at least one of the third surface and the fourth surface, on a side surface perpendicular to the second surface and the third surface.

The push switch according to the present disclosure can have a small separation distance from a side surface of a mounting board, when it is mounted on the mounting board through a step.

BRIEF DESCRIPTION OF THE DRAWINGS

Other features and advantages of the present invention will be apparent from the ensuing description, taken in conjunction with the accompanying drawings, in which:

FIG. 3 is a schematic rear view illustrating the push switch 1 according to the first embodiment;

DESCRIPTION

Embodiments of the present invention will be described in detail below with reference to the drawings. However, it should be noted that the technical scope of the present invention is not limited to these embodiments and encompasses the invention described in the scope of claims and its equivalents.

Figure 1A:
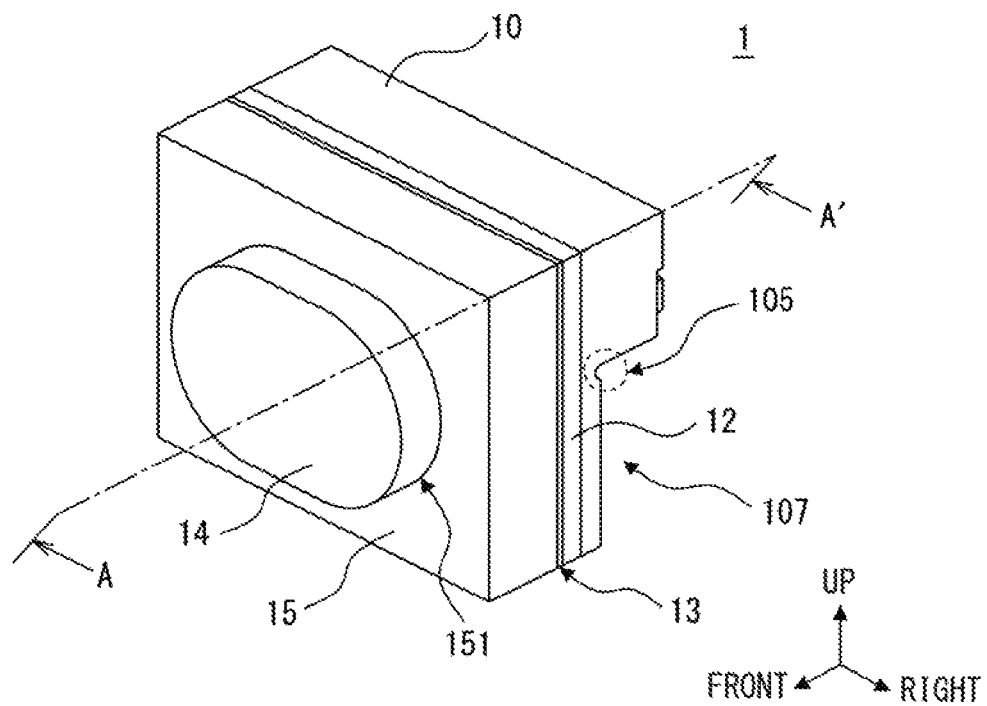
FIG. 1A is a perspective view illustrating a push switch 1 according to a first embodiment when viewed from the upper front right.
Figure 1B:
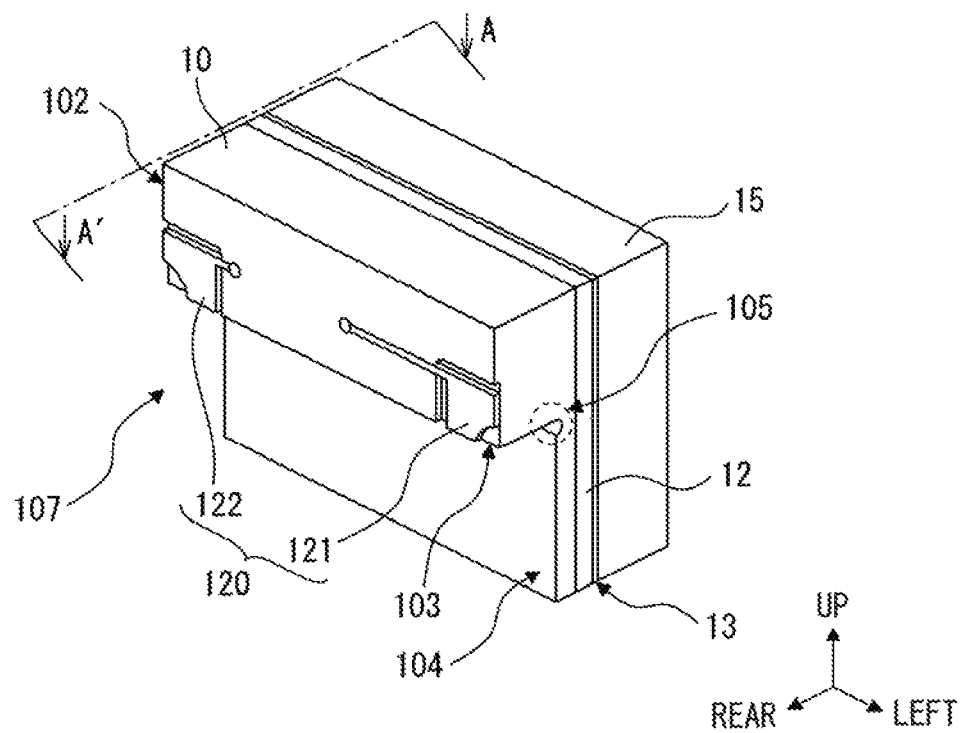
FIG. 1B is a perspective view illustrating the push switch 1 according to the first embodiment when viewed from the upper rear left.
Figure 2:
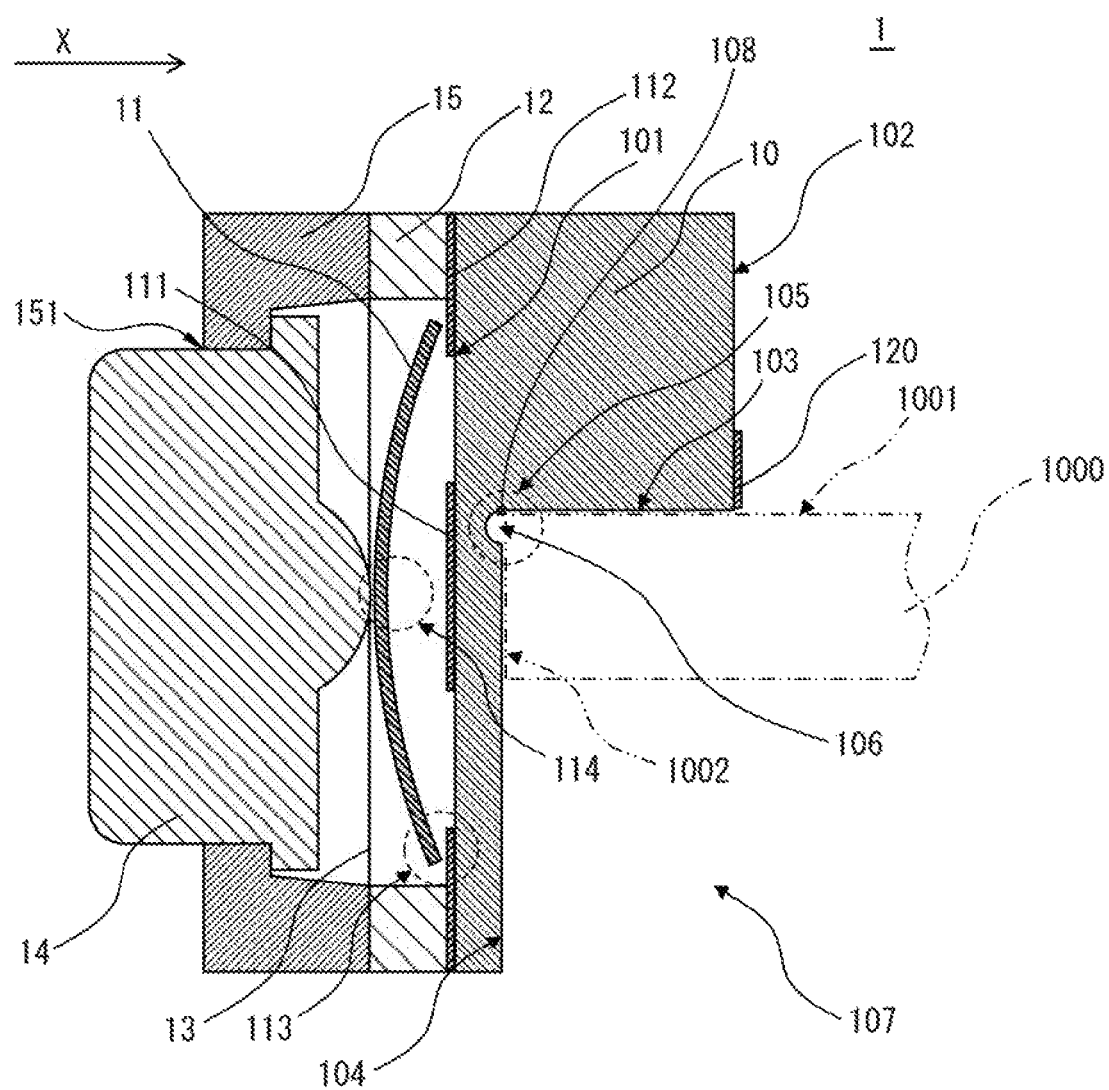
FIG. 2 is a schematic view illustrating the push switch 1 according to the first embodiment in a cross section A-A'.

FIG. 1A is a perspective view illustrating a push switch 1 according to a first embodiment when viewed from the upper front right, and FIG. 1B is a perspective view illustrating the push switch 1 when viewed from the upper rear left. FIG. 2 is a schematic view illustrating the push switch in a cross section A-A'. FIG. 3 is a schematic rear view illustrating the push switch 1. FIG. 2 is a schematic view in a cross section B in FIG. 3.

The cross section A-A' is a plane along which the push switch 1 is cut on a diagonal line passing through the upper right corner and the lower left corner of the push switch 1 as viewed in the forward direction.

The push switch 1 includes a substrate 10, a movable contact point 11, a spacer 12, a waterproof sheet 13, a pressing member 14, and a case 15.

The substrate 10 is made of a resin such as glass epoxy and includes a first surface 101, a second surface 102, a third surface 103, a fourth surface 104, and a corner 105. The third surface 103, the fourth surface 104, and the corner 105 form a step 107 which functions as an attachment portion to be attached to a mounting board 1000 when the push switch 1 is mounted on the mounting board 1000.

Figure 4A:
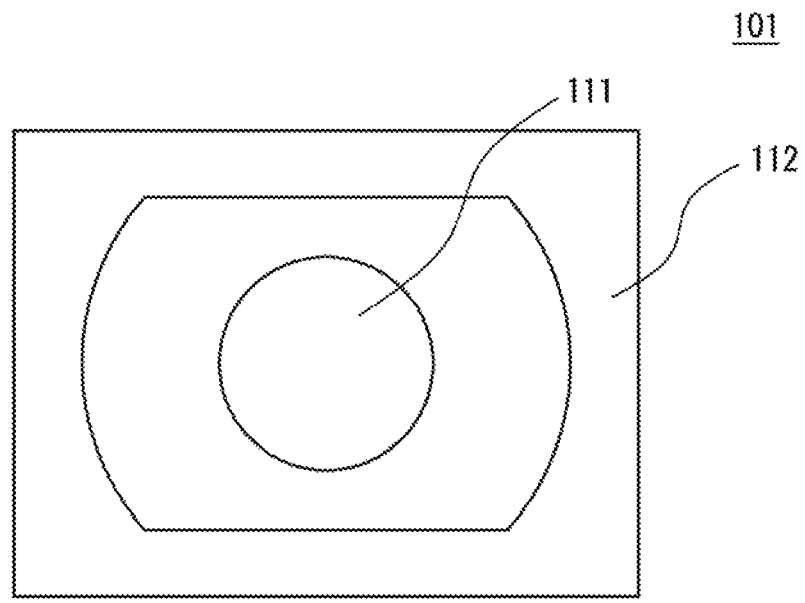
FIG. 4A is a plan view of a first surface 101 illustrated in FIG. 2.
Figure 4B:
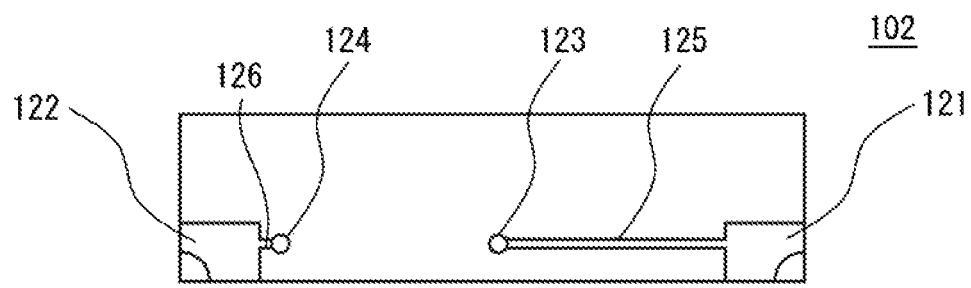
FIG. 4B is a plan view of a second surface 102 illustrated in FIG. 2.

FIG. 4A is a plan view of the first surface 101 illustrated in FIG. 2, and FIG. 4B is a plan view of the second surface 102 illustrated in FIG. 2.

The first surface 101 is a rectangular flat surface, the spacer 12 adheres to the first surface 101 along its outer edge, and a first fixed contact point 111 and a second fixed contact point 112 are formed on the first surface 101 in a region surrounded by the spacer 12. The first fixed contact point 111 is a circular conductive member formed near the center, and the second fixed contact point 112 is a frame-shaped conductive member surrounding the first fixed contact point 111. The first fixed contact point 111 and the second fixed contact point 112 are made of, e.g., copper.

The second surface 102 is a rectangular flat surface located opposite to the first surface 101 and facing in the direction opposite to the first surface 101. The second surface 102 is equipped with external terminals 120. The external terminals 120 include a first external terminal 121 connected to the first fixed contact point 111 through a first via 123 and a first wiring line 125, and a second external terminal 122 connected to the second fixed contact point 112 through a second via 124 and a second wiring line 126.

The first via 123 and the second via 124 connect the contact points formed on the first surface 101 to the wiring lines formed in the second surface 102. The first via 123 and the second via 124 are formed by arranging conductors in holes running through a substrate by, e.g., plating. The first via 123 is connected to the first fixed contact point 111 and the first wiring line 125, and the second via 124 is connected to the second fixed contact point 112 and the second wiring line 126.

The first wiring line 125 and the second wiring line 126 are conductors such as copper foil formed on the front surface of the substrate 10. The first wiring line 125 connects the first external terminal 121 to the first via 123, and the second wiring line 126 connects the second external terminal 122 to the second via 124.

The third surface 103 is a rectangular flat surface formed between the first surface 101 and the second surface 102. The third surface 103 extends from the second surface 102 to the corner 105 in a direction perpendicular to the first surface 101 and the second surface 102. The third surface 103 comes into contact with a front surface 1001 of the mounting board 1000 when the push switch 1 is mounted on the mounting board 1000.

The fourth surface 104 is a rectangular flat surface formed between the first surface 101 and the second surface 102 and facing in the direction opposite to the first surface 101. The fourth surface 104 extends from the corner 105 in a direction perpendicular to the third surface 103, i.e., a direction parallel to the first surface 101 and the second surface 102. The fourth surface 104 comes into contact with a side surface 1002 of the mounting board 1000 when the push switch 1 is mounted on the mounting board 1000.

The corner 105 includes a groove 106 recessed with respect to the fourth surface 104. The corner 105 is formed as a recess having a semicircular cross section ranging from the right end to the left end of the upper side of the fourth surface 104, when the corner 105 illustrated FIG. 2 is viewed from the right.

Figure 5A:
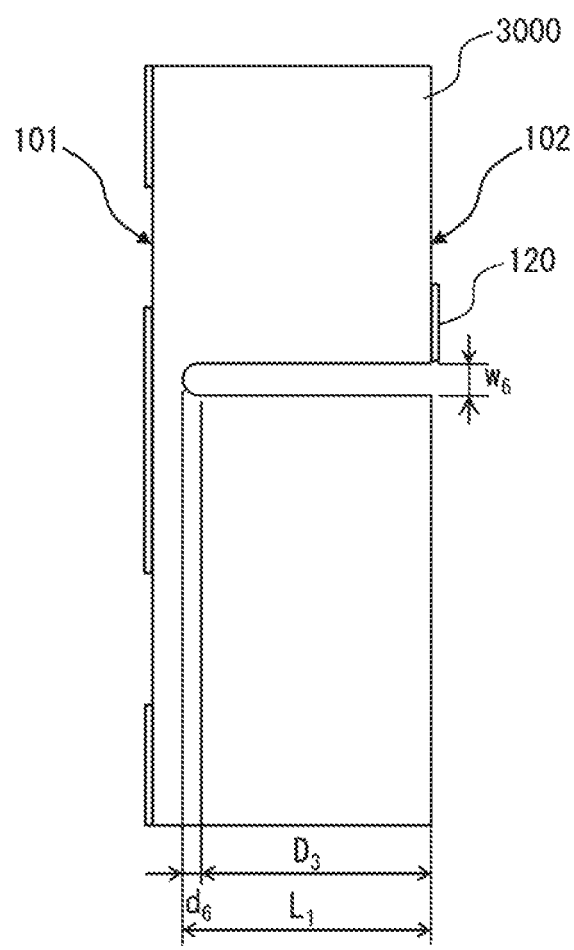
FIG. 5A is a view for explaining a first step in a process for forming a step as illustrated in FIG. 2.
Figure 5B:
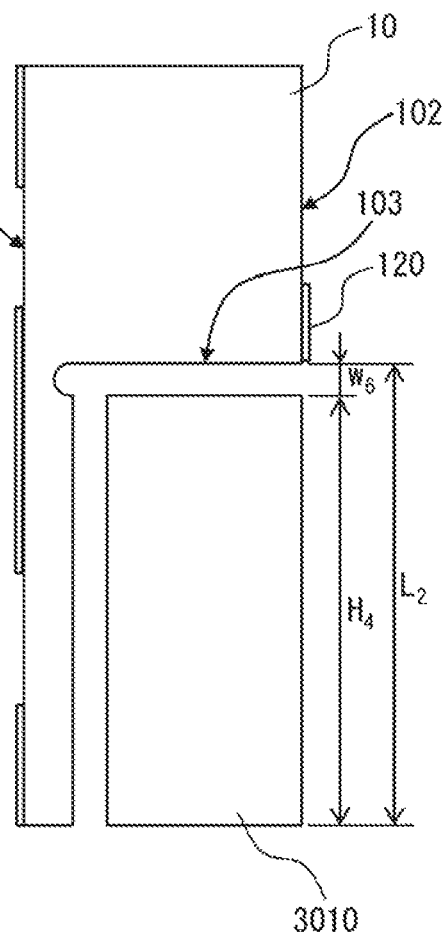
FIG. 5B is a view for explaining a second step in the process for forming a step as illustrated in FIG. 2.

FIGS. 5A and 5B are views for explaining a process for forming a step as illustrated in FIG. 2, in which FIG. 5A illustrates a first step, and FIG. 5B illustrates a second step.

In the first step, a dicing saw (not illustrated) cuts a nearly rectangular parallelepiped substrate 3000 across a length $L_1$ in a direction perpendicular to the first surface 101, from the surface of the substrate 3000 opposite to the first surface 101. In this case, the dicing saw cuts the substrate 3000 from the vicinity of the lower end of the external terminal 120. The length $L_1$ is the sum of a depth $D_3$ of the third surface 103 and a depth $d_6$ of the groove 106. The width cut by the dicing saw corresponds to a width $w_6$ of the groove 106.

In the second step, the dicing saw cuts the substrate 3000 across a length $L_2$ in a direction parallel to the first surface 101, from a surface perpendicular to the first surface 101 of the substrate 3000 and opposite to that on which the external terminal 120 is not placed of the surfaces formed by cutting in the first step. The dicing saw forms a substrate 10 by isolating a cut material 3040 from the substrate 3000. The dicing saw cuts the substrate 3000 to set the dimension of the third surface 103 in the depth direction to $D_3$. The length $L_2$ is the sum of a height $H_4$ of the fourth surface and the width $w_6$ of the groove 106.

The movable contact point 11 is made of an elastic conductive member such as stainless steel and brass formed into a thin dome shape. The movable contact point 11 may be formed into, e.g., a barrel shape having opposed sides and formed by cutting a convex dome-shaped leaf spring member. The movable contact point 11 may also have a circular shape and other dome shapes.

The movable contact point 11 includes a peripheral edge 113 and a center 114. The peripheral edge 113 of the movable contact point 11 is at least partially in contact with the second fixed contact point 112. The center 114 of the movable contact point 11 is spaced apart from the first fixed contact point 111 when the pressing member 14 is not depressed. When the pressing member 14 is not depressed, the first external terminal 121 connected to the first fixed contact point 111 and the second external terminal 122 connected to the second fixed contact point 112 are not electrically connected to each other. In this case, the push switch 1 is OFF. For a barrel-shaped movable contact point 11, the peripheral edge 113 has its edge portions in a horizontal direction in contact with the first surface 101 and its edge portions in a vertical directions not in contact with the first surface 101.

When the pressing member 14 is depressed and moved in a depression direction indicated by an arrow X, the center 114 of the movable contact point 11 moves in the depression direction together with the pressing member 14 and comes into contact with the first fixed contact point 111. When the center 114 of the movable contact point 11 comes into contact with the first fixed contact point 111 upon depression of the pressing member 14, the first external terminal 121 and the second external terminal 122 are electrically connected to each other, and the push switch 1 is turned on. When the pressing member 14 is released, the movable contact point 11 elastically returns to its original shape, the center 114 of the movable contact point 11 moves upwards and separates from the first fixed contact point 111, and the push switch 1 is turned off.

The spacer 12 is a frame-shaped resin sheet such as a polyimide including an opening hole which can accommodate the movable contact point 11 in its central region. The outer frame of the spacer 12 has nearly the same shape that of the outer periphery of the first surface 101 the substrate 10. The back surface of the spacer 12 may be fixed by, e.g., bonding to the substrate 10 through an adhesive layer (not illustrated).

The waterproof sheet 13 is made of a resin such as polyethylene or vinyl chloride and has nearly the same shape as that of the outer periphery of the first surface 101 of the substrate 10. The outer edge of the back surface of the waterproof sheet 13 is bonded to the front surface of the spacer 12 through an adhesive layer (not illustrated). The waterproof sheet 13 seals the space to accommodate the movable contact point 11 and prevents the entrance of, e.g., water and foreign particles from the case 15 into the space to accommodate the movable contact point 11.

The pressing member 14 is made of a resin such as ABS resin and supported on its periphery by the case 15. Upon depression of the pressing member 14, it moves in a depression direction indicated by the arrow X and presses the center 114 of the movable contact point 11.

The case 15 is made of a resin such as ABS resin and includes an opening 151 formed in it, into which the pressing member 14 can be inserted. The back surface of the case 15 is bonded to the front surface of the waterproof sheet 13 through an adhesive layer (not illustrated).

The push switch 1 is manufactured by sequentially arranging the substrate 10, the movable contact point 11, the spacer 12, the waterproof sheet 13, the pressing member 14, and the case 15. First, the back surface of the spacer 12 is bonded to the first surface 101 of the substrate 10. Then, the movable contact point 11 is placed so that the peripheral edge 113 is in contact with the second fixed contact point 112 formed on the first surface 101. The back surface of the waterproof sheet 13 is bonded to the front surface of the spacer 12. The back surface of the case 15 having the pressing member 14 inserted into the opening 151 is bonded to the front surface of the waterproof sheet 13.

The push switch 1 can have a small separation distance between the fourth surface 104 and the side surface 1002 of the mounting board 1000, when it is mounted on the mounting board 1000, with the corner 105 of the step 107 formed to include a groove 106 recessed with respect to the fourth surface 104. Hence, the push switch 1 can appropriately transmit a pressing force applied to the push switch 1 upon depression to the mounting board 1000.

Since the push switch 1 can include a step formed by cutting a single substrate, the manufacturing cost can be kept less than when a step is armed by laminating two substrates. When a step is formed by laminating two substrates, the dimensional accuracy of the step may degrade due to a shift in position of the substrates upon lamination. Since, however, the push switch 1 includes a step formed by cutting a single substrate, the dimensional accuracy of the step is less likely to degrade.

Figure 6:
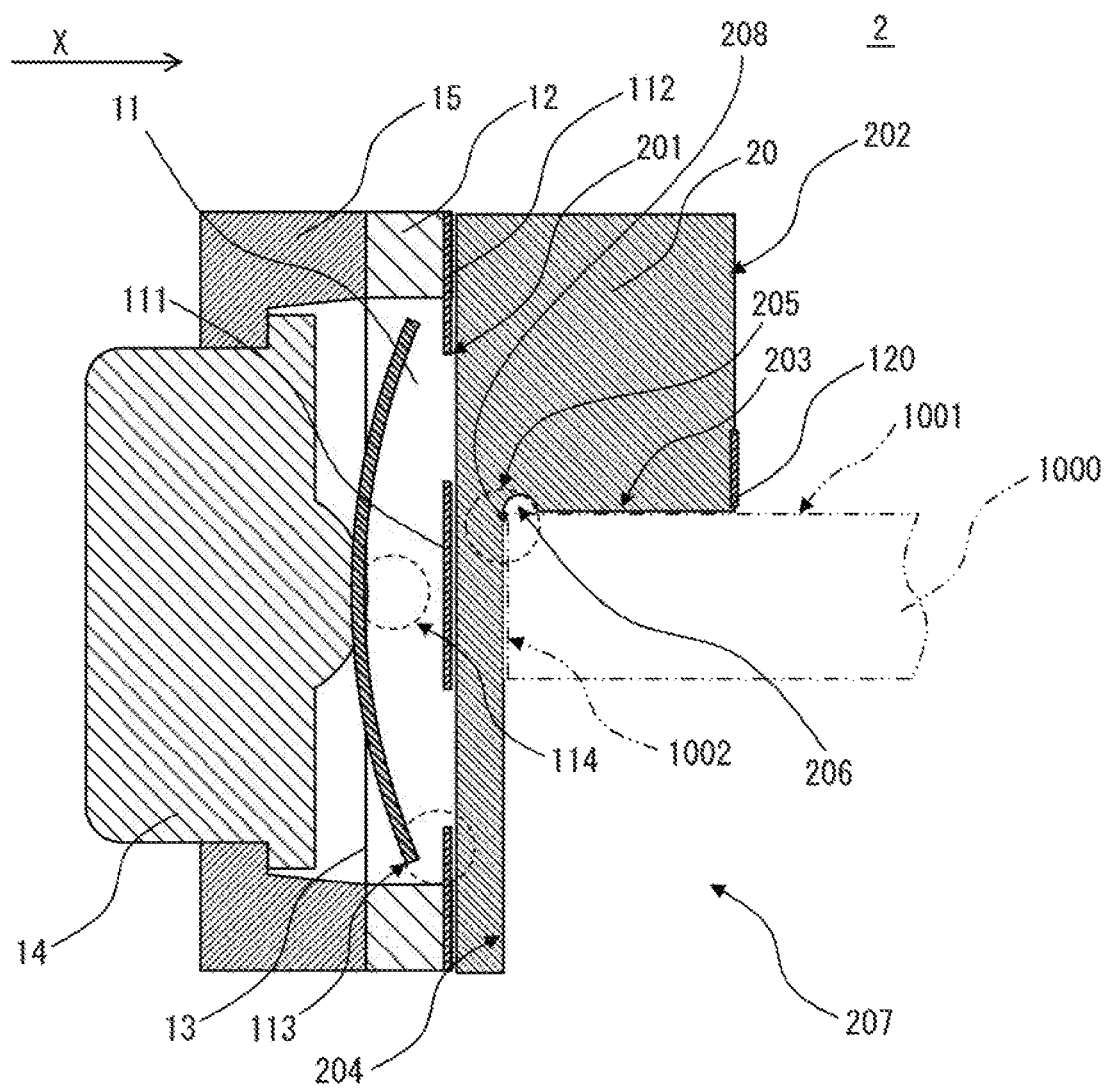
FIG. 6 is a schematic sectional view illustrating a push switch 2 according to a first modification to the first embodiment.
Figure 7:
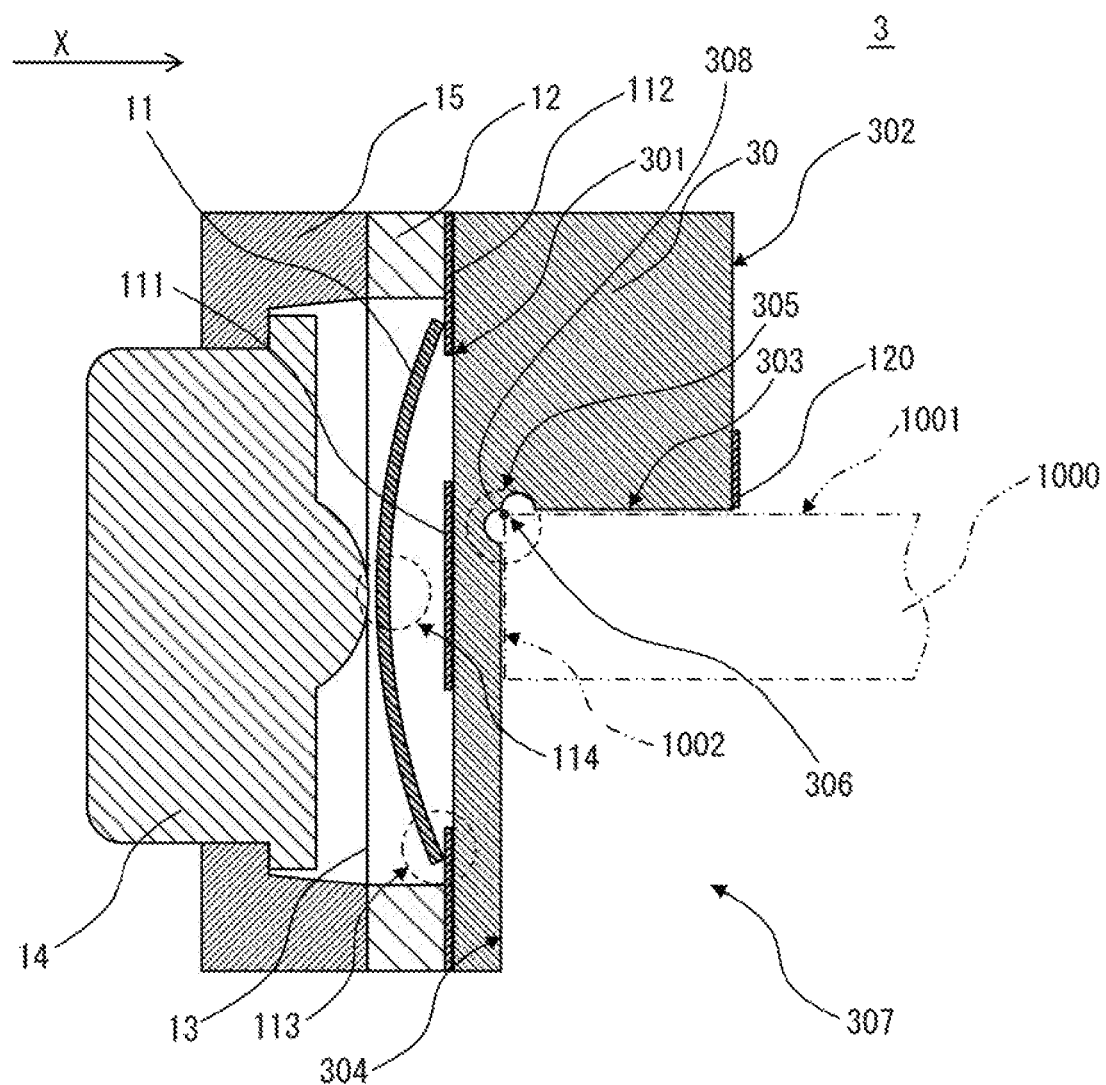
FIG. 7 is a schematic sectional view illustrating a push switch 3 according to a second modification to the first embodiment.

FIG. 6 is a schematic sectional view illustrating a push switch 2 according to a first modification to the first embodiment, and FIG. 7 is a schematic sectional view illustrating a push switch 3 according to a second modification to the first embodiment.

The push switch 2 is different from the push switch 1 in that the former includes a substrate 20 instead of the substrate 10. Since the structures and functions of components constituting the push switch 2 other than the substrate 20 are the same as those of components constituting the push switch 1 denoted by the same reference numerals, a detailed description thereof will not be given herein.

The substrate 20 is different from the substrate 10 in that the former includes a corner 205 including a groove 206 recessed with respect to a third surface 203, instead of the corner 105. The groove 206 is formed by cutting longer than the height of a fourth surface 204 in the second step of forming the fourth surface 204 instead of the first step of forming the third surface 203, in forming a step 207.

The push switch 3 is different from the push switch 1 in that the former includes a substrate 30 instead of the substrate 10. Since the structures and functions of components constituting the push switch 3 other than the substrate 30 are the same as those of components constituting the push switch 1 denoted by the same reference numerals, a detailed description thereof will not be given herein.

The substrate 30 is different from the substrate 10 in that the former includes a corner 305 including a groove 306 recessed with respect to both a third surface 303 and a fourth surface 304, instead of the corner 105. The groove 306 is formed by cutting longer than the depth of the third surface 303 in the first step of forming the third surface 303 and cutting longer than the height of the fourth surface 304 in the second step of forming the fourth surface 304, in forming a step 307.

Figure 8:
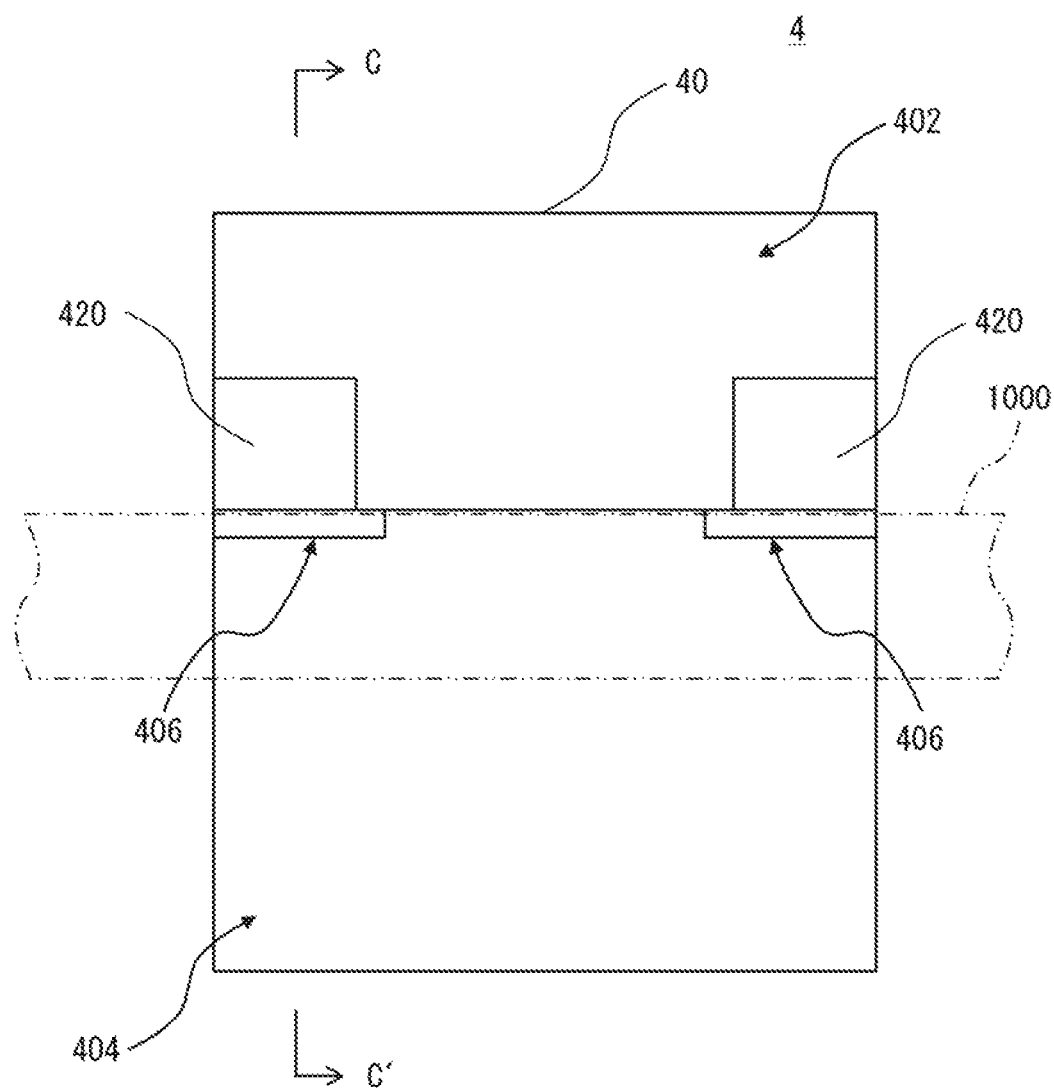
FIG. 8 is a schematic rear view illustrating a push switch 4 according to a third modification to the first embodiment.

FIG. 8 is a schematic rear view illustrating a push switch 4 according to a third modification to the first embodiment.

The push switch 4 is different from the push switch 1 in that the former includes a substrate 40 instead of the substrate 10. A schematic view in a cross section C-C' illustrated in FIG. 8 is similar to that illustrated in FIG. 2. Since the structures and functions of components constituting the push switch 4 other than the substrate 40 are the same as those of components constituting the push switch 1 denoted by the same reference numerals, a detailed description thereof will not be given herein.

The substrate 40 is different from the substrate 10 in that the former includes a corner 405 including grooves 406, instead of the corner 105. The grooves 406 are arranged along the line of intersection between the third surface 103 and the fourth surface 104. Referring to FIG. 2, the position of the line of intersection between the third surface 103 and the fourth surface 104 is indicated by a point of intersection 108 between the cross section A-A' and the line of intersection between the third surface 103 and the fourth surface 104.

A plurality of grooves 406 are formed in the push switch 4 at positions corresponding to respective external terminals 420, as illustrated in FIG. 8. The push switch 4 includes a plurality of grooves 406 at positions corresponding to respective external terminals 420 and therefore achieves improved soldering to a mounting board 1000.

Figure 9:
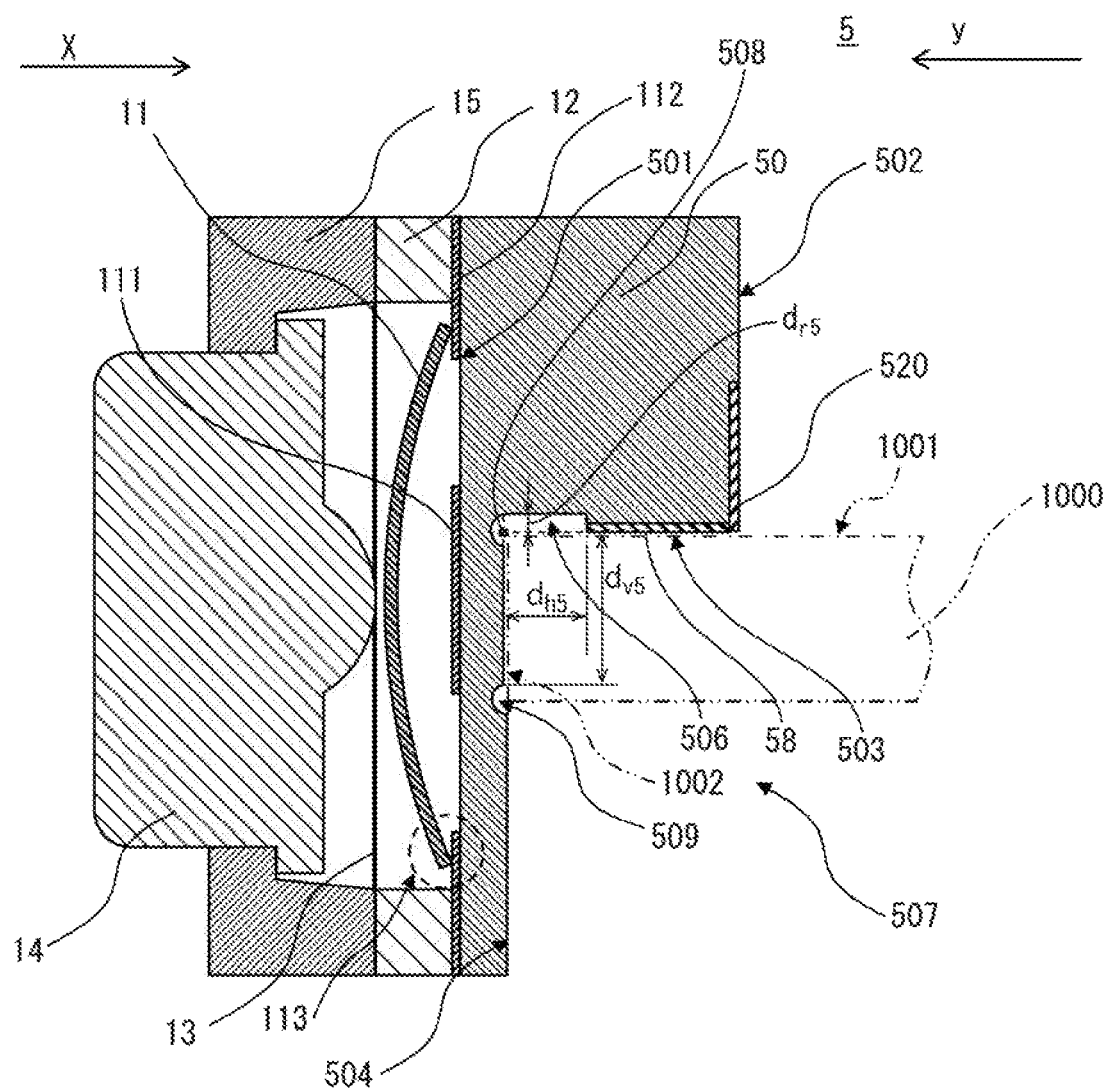
FIG. 9 is a schematic sectional view illustrating a push switch 5 according to a fourth modification to the first embodiment.
Figure 10:
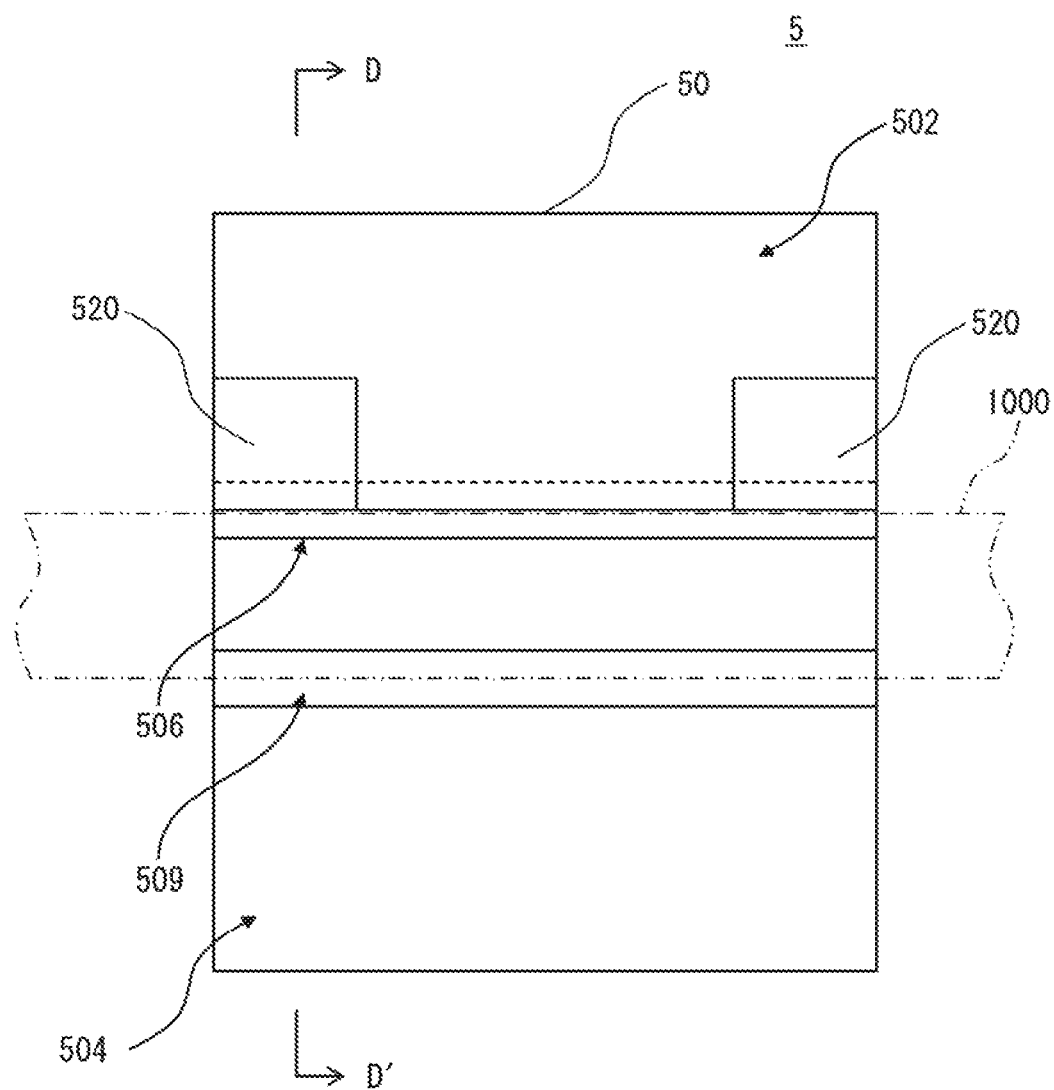
FIG. 10 is a schematic rear view illustrating the push switch 5 according to the fourth modification to the first embodiment.

FIG. 9 is a schematic sectional view illustrating a push switch 5 according to a fourth modification to the first embodiment. FIG. 10 is a schematic rear view illustrating the push switch 5 according to the fourth modification to the first embodiment. FIG. 9 is a schematic view in a cross section D-D' illustrated in FIG. 10.

The push switch 5 is different from the push switch 1 in that the former includes a substrate 50 instead of the substrate 10. Since the structures and functions of components constituting the push switch 5 other than the substrate 50 are the same as those of components constituting the push switch 1 denoted by the same reference numerals, a detailed description thereof will not be given herein.

The substrate 50 is different from the substrate 10 in that the former includes a lead frame 58 buried in a third surface 503. The substrate 50 is further different from the substrate 10 in that the former includes a recess 509 recessed with respect to a fourth surface 504.

The lead frame 58 is formed in a region spaced apart from the line of intersection between the third surface 503 and the fourth surface 504 by a predetermined distance $d_{h5}$ or more. A groove 506 is formed along the line of intersection between the third surface 503 and the fourth surface 504. The groove 506 includes a region recessed with respect to the third surface 503 and a region recessed with respect to the fourth surface 504.

The predetermined distance $d_{h5}$ is larger than a depth $d_{r5}$ of the recess of the groove 506 from the third surface 503. In the groove 506, the length from the fourth surface 504 to a second surface 502 is the predetermined distance $d_{h5}$. Therefore, the groove 506 has a length from the fourth surface 504 to the second surface 502 larger than the depth of the recess of the groove 506 from the third surface 503.

The recess 509 is formed in a region of the fourth surface 504 spaced apart from the line of intersection between the third surface 503 and the fourth surface 504 by a predetermined distance $d_{v5}$ or more.

When the push switch 5 is mounted on a mounting board 1000, external terminals 520 are soldered to a circuit formed on a front surface 1001 of the mounting board 1000. Excessive solder and flux may reach the groove 506 upon passing between the front surface 1001 of the mounting board 1000 and the third surface 503 of the push switch 5. The groove 506 can accommodate the excessive solder and flux.

The groove 506 of the push switch 5 includes a region recessed with respect to the third surface 503. This structure can set the distance between the external terminals 520 and the groove 506 small in the push switch 5. The push switch 5 has a small distance between the external terminals 520 and the groove 506 and therefore achieves more efficient accommodation of excessive solder, and flux in the groove 506. Hence, the push switch 5 can be more appropriately soldered to the mounting board 1000.

Since the push switch 5 includes a recess 509 in the fourth surface 504, even when the mounting board 1000 includes a protrusion such as a burr at the lower end of a side surface 1002, the protrusion can be accommodated in the recess 509. Hence, the push switch 5 can be stably positioned with respect to the mounting board 1000.

Figure 11:
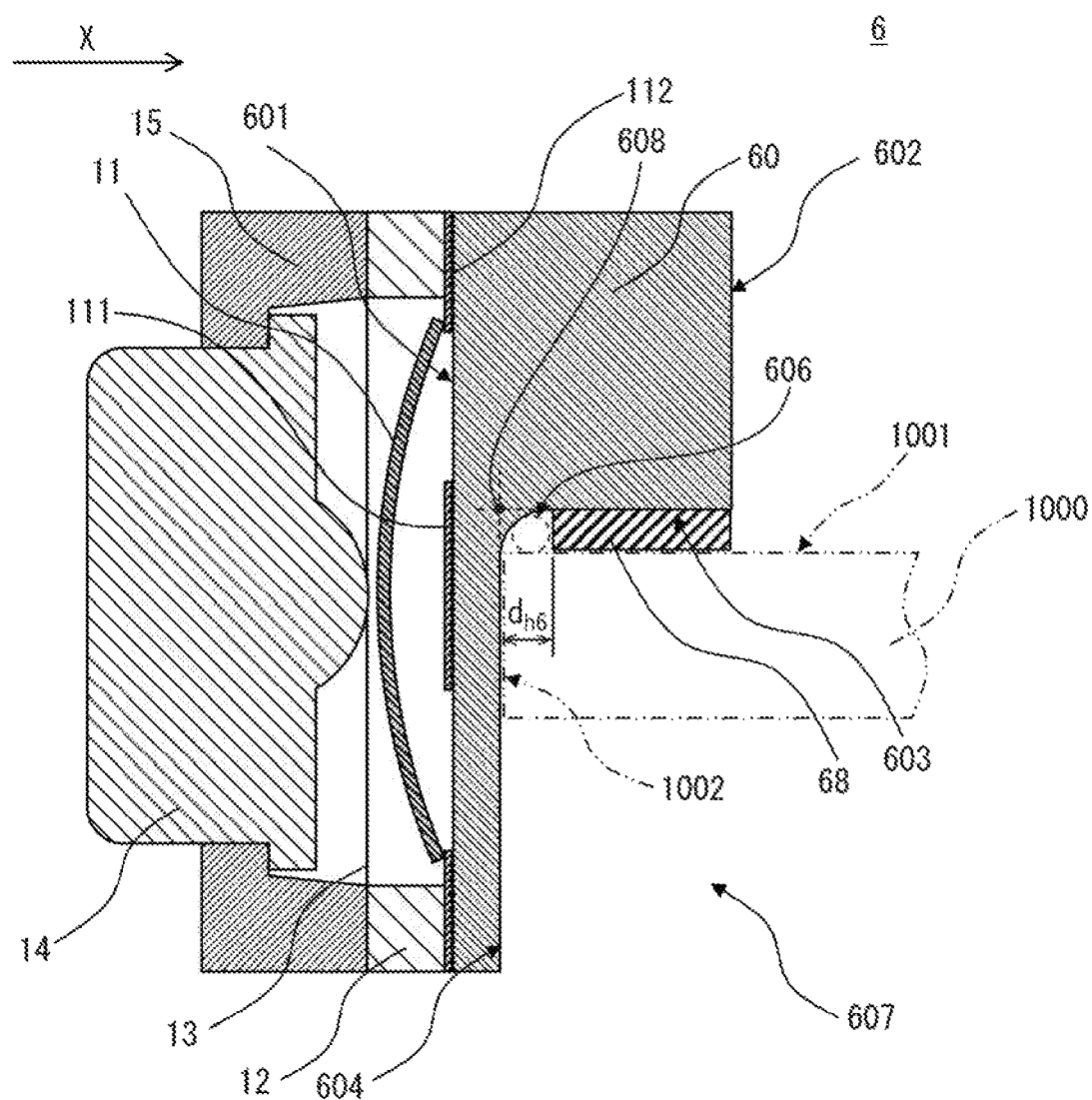
FIG. 11 is a schematic sectional view illustrating a push switch 6 according to a second embodiment.

FIG. 11 is a schematic sectional view illustrating a push switch 6 according to a second embodiment.

The push switch 6 is different from the push switch 1 in that the former includes a substrate 60 instead of the substrate 10. Since the structures and functions of components constituting the push switch 6 other than the substrate 60 are the same as those of components constituting the push switch 1 denoted by the same reference numerals, a detailed description thereof will not be given herein.

The substrate 60 is different from the substrate 10 in that the former includes a lead frame 68 protruding from a third surface 603. The lead frame 68 is a metal member formed in a region spaced apart from the line of intersection between the third surface 603 and a fourth surface 604 by a predetermined distance or more. The space formed between the lead frame 68 and the fourth surface 604 constitutes a groove 606. The groove 606 may not be recessed with respect to at least one of the third surface 603 and the fourth surface 604.

When the connection portion between the third surface 603 and the fourth surface 604 forms a curved surface, the line of intersection between a virtual third surface obtained by extending the flat portion of the third surface 603 and a virtual fourth surface obtained by extending the flat portion of the fourth surface 604 can be defined as the line of intersection between the third surface 603 and the fourth surface 604.

Referring to FIG. 11, the position of the line of intersection between the third surface 603 and the fourth surface 604 is indicated by a point of intersection 608 between the cross section A-A' and the line of intersection between the third surface 603 and the fourth surface 604. The lead frame 68 is formed in a region of the third surface 603 spaced apart from the line of intersection between the third surface 603 and the fourth surface 604 by a predetermined distance $d_{h6}$ or more.

The lead frame 68 is connected to the first fixed contact point 111 or the second fixed contact point 112. When the push switch 6 is mounted on a mounting board 1000 by reflow soldering, the lead frame 68 is soldered to a circuit formed on a front surface 1001 of the mounting board 1000.

The push switch 6 may include another metal member such as a soldering pattern on the third surface 603, instead of the lead frame 68.

Figure 12:
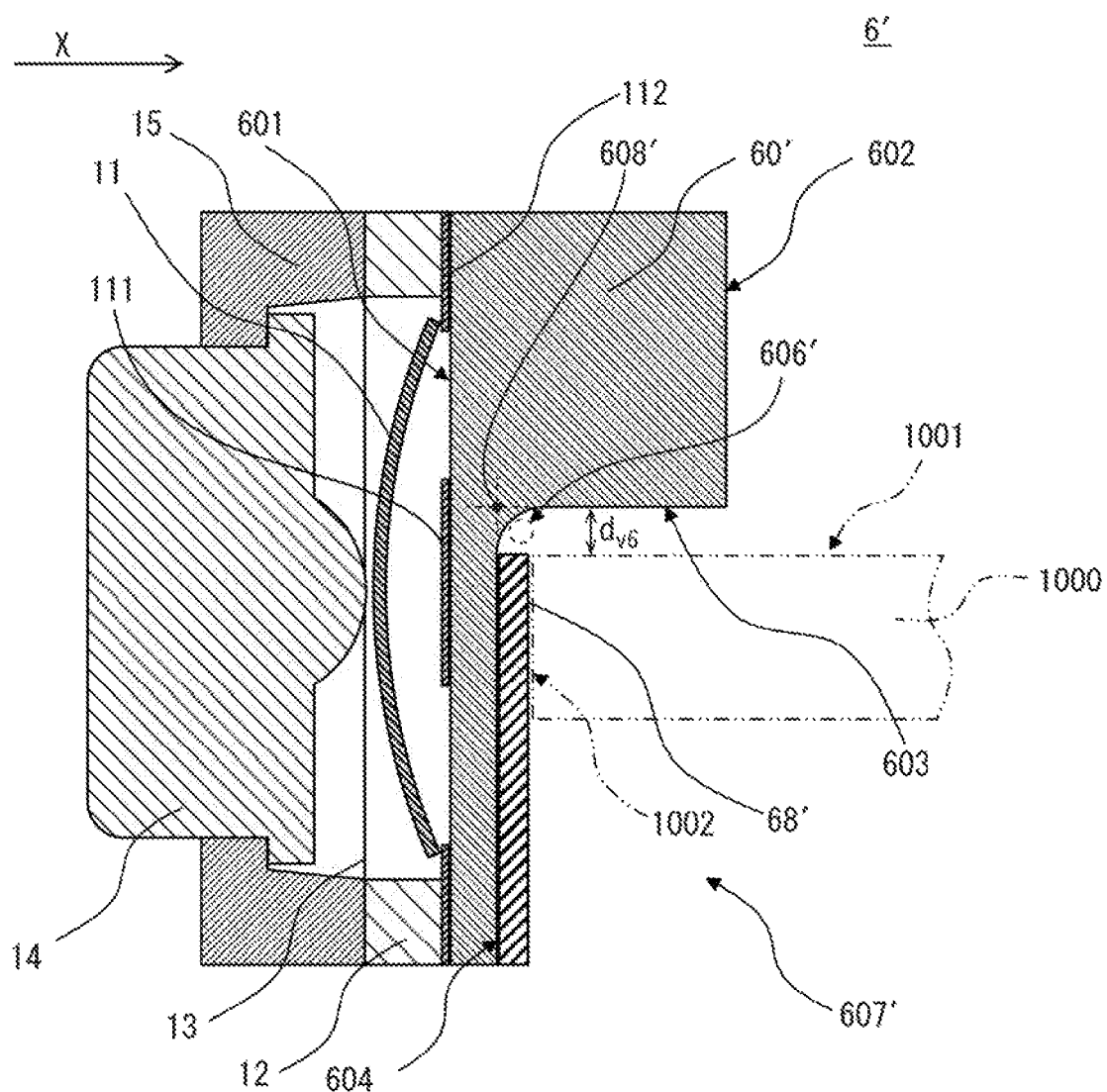
FIG. 12 is a schematic sectional view illustrating a push switch 6' according to a modification to the second embodiment.

FIG. 12 is a schematic sectional view illustrating a push switch 6' according to a modification to the second embodiment.

The push switch 6' is different from the push switch 6 in that the former includes a substrate 60' instead of the substrate 60. Since the structures and functions of components constituting the push switch 6' other than the substrate 60' are the same as those of components constituting the push switch 6 denoted by the same reference numerals, a detailed description thereof will not be given herein.

The substrate 60' is different from the substrate 60 in that the former includes a lead frame 68' protruding from the fourth surface 604, instead of the lead frame 68 protruding from the third surface 603. The lead frame 68' is formed in a region spaced apart from the line of intersection between the third surface 603 and the fourth surface 604 by a predetermined distance or more. The space formed between the lead frame 68' and the third surface 603 constitutes a groove 606'. The groove 606' may not be recessed with respect to at least one of the third surface 603 and the fourth surface 604.

The lead frame 68' is formed in a region of the fourth surface 604 spaced apart from the line of intersection between the third surface 603 and the fourth surface 604 by a predetermined distance $d_{v6}$ or more.

Figure 13:
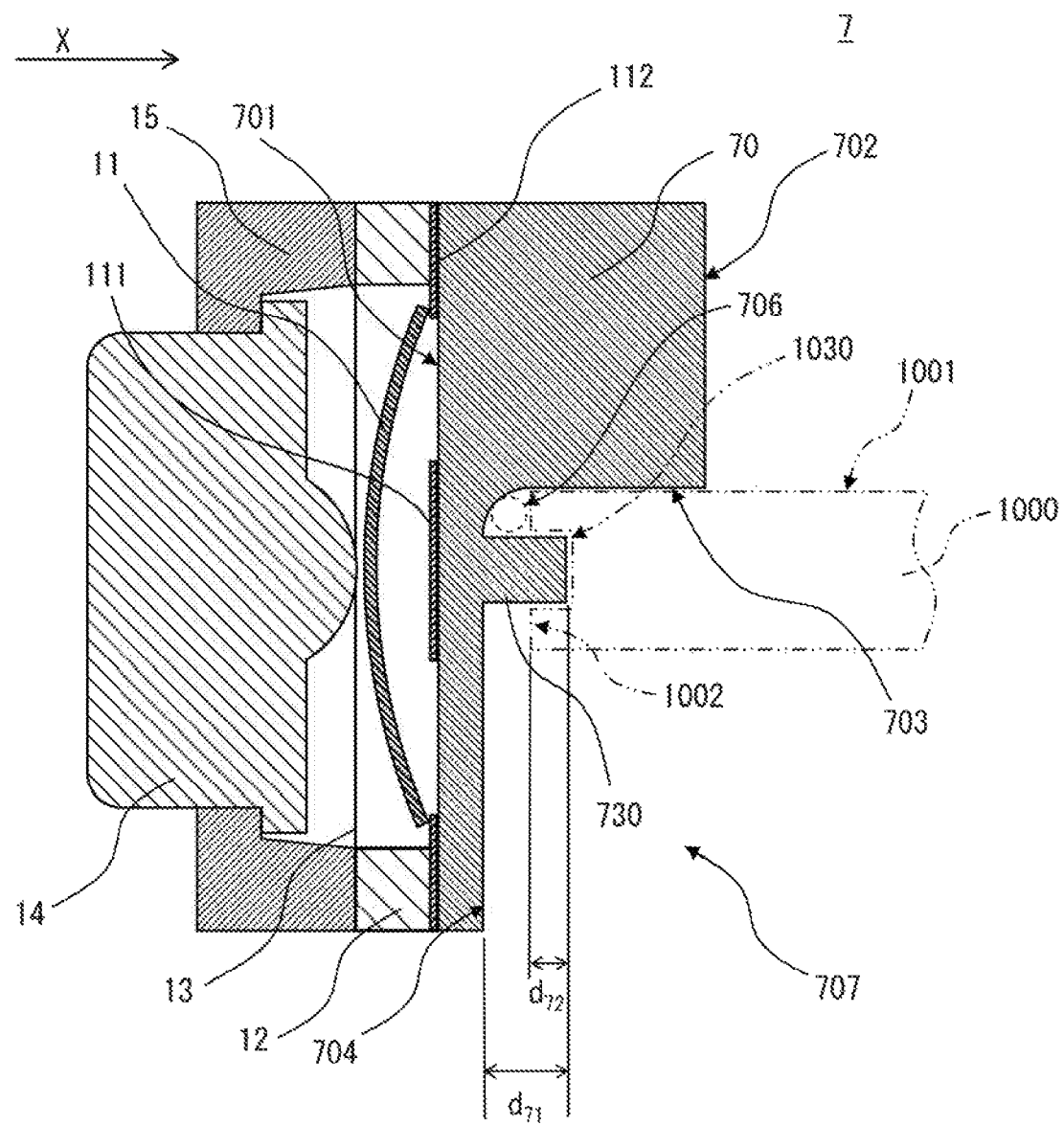
FIG. 13 is a schematic sectional view illustrating a push switch 7 according to a third embodiment.

FIG. 13 is a schematic sectional view illustrating a push switch 7 according to a third embodiment.

The push switch 7 is different from the push switch 1 in that the former includes a substrate 70 instead of the substrate 10. Since the structures and functions of components constituting the push switch 7 other than the substrate 70 are the same as those of components constituting the push switch 1 denoted by the same reference numerals, a detailed description thereof will not be given herein.

The substrate 70 is different from the substrate 10 in that the former includes an engagement projection 730 protruding from a fourth surface 704. The engagement projection 730 can engage with an engagement recess 1030 formed in a side surface 1002 of a mounting board 1000. A height $d_{71}$ of the engagement projection 730 from the fourth surface 704 is greater than a depth $d_{72}$ of the engagement recess 1030 formed in the mounting board 1000.

In the push switch 7, the engagement projection 730 engages with the engagement recess 1030 when the push switch 7 is mounted on the mounting board 1000. Hence, the push switch 7 can be accurately placed at a mounting position on the mounting board 1000.

The distance between the side surface 1002 of the mounting board 1000 and the fourth surface 704 is not smaller than $d_{71}$-$d_{72}$. The space formed among the side surface 1002 of the mounting board 1000, the fourth surface 704, and the engagement projection 730 constitutes a groove 706. The groove 706 may not be recessed with respect to a third surface 703 and the fourth surface 704.

Figure 14:
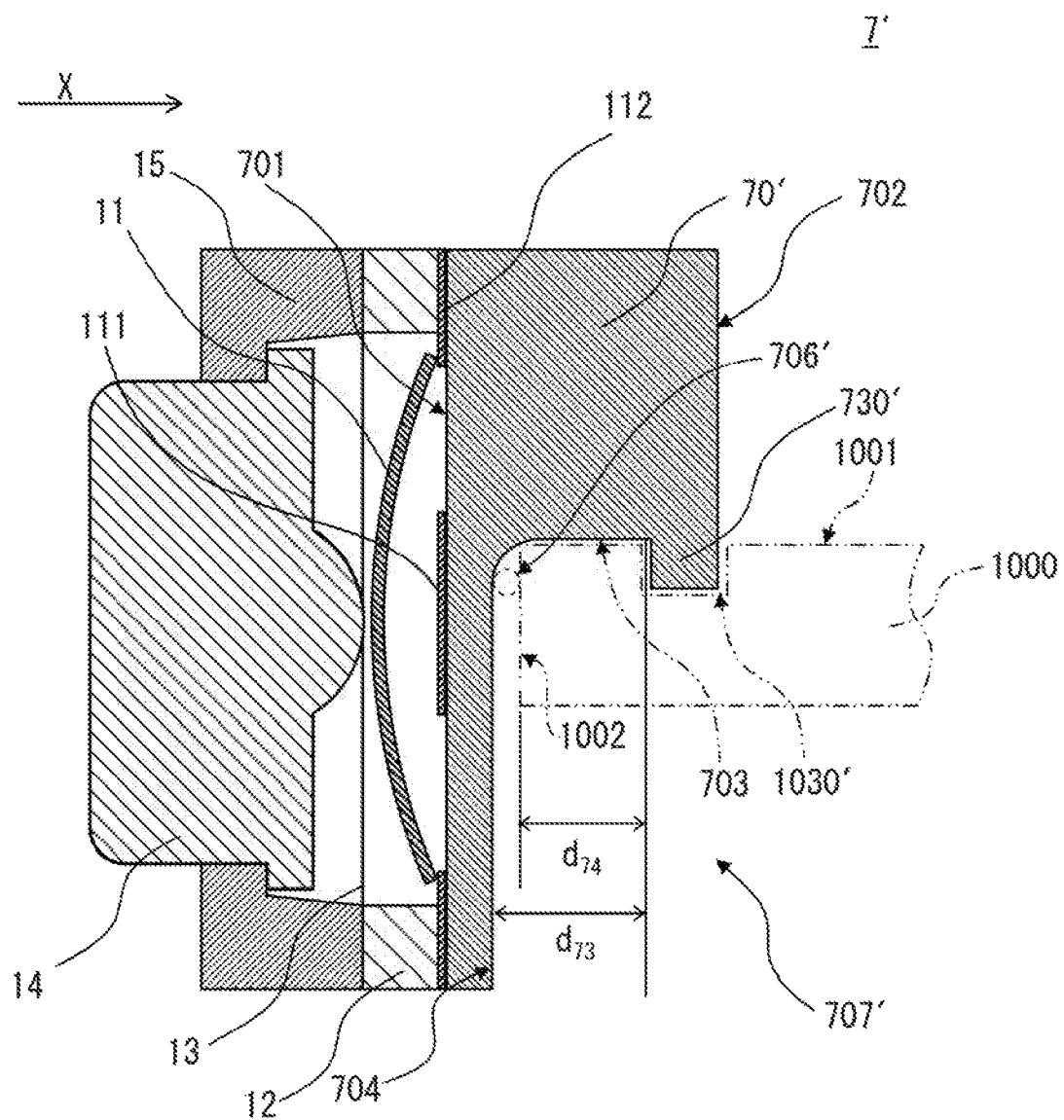
FIG. 14 is a schematic sectional view illustrating a push switch 7' according to a modification to the third embodiment.

FIG. 14 is a schematic sectional view illustrating a push switch 7' according to a modification to the third embodiment.

The push switch 7' as different from the push switch 7 in that the former includes a substrate 70' instead of the substrate 70. Since the structures and functions of components constituting, the push switch 7' other than the substrate 70' are the same as those of components constituting the push switch 7 denoted by the same reference numerals, a detailed description thereof will not be given herein.

The substrate 70' is different from the substrate 70 in that the former includes an engagement projection 730' protruding from the third surface 703. The engagement projection 730' can engage with an engagement recess 1030' formed in a front surface 1001 of a mounting board 1000. The push switch 7' is mounted so that the fourth surface 704 of the push switch 7' faces a side surface 1002, i.e., an end of the mounting board 1000. The engagement projection 730' is formed at a position having a distance $d_{73}$ from the fourth surface 704 larger than a distance $d_{74}$ from the side surface 1002 of the mounting board 1000 to the engagement recess 1030'.

The distance between the side surface 1002 of the mounting board 1000 and the fourth surface 704 is not smaller than $d_{73}$-$d_{74}$. The space formed between the side surface 1002 of the mounting board 1000 and the fourth surface 704 constitutes a groove 706'. The groove 706' may not be recessed with respect to the third surface 703 and the fourth surface 704.

Figure 15A:
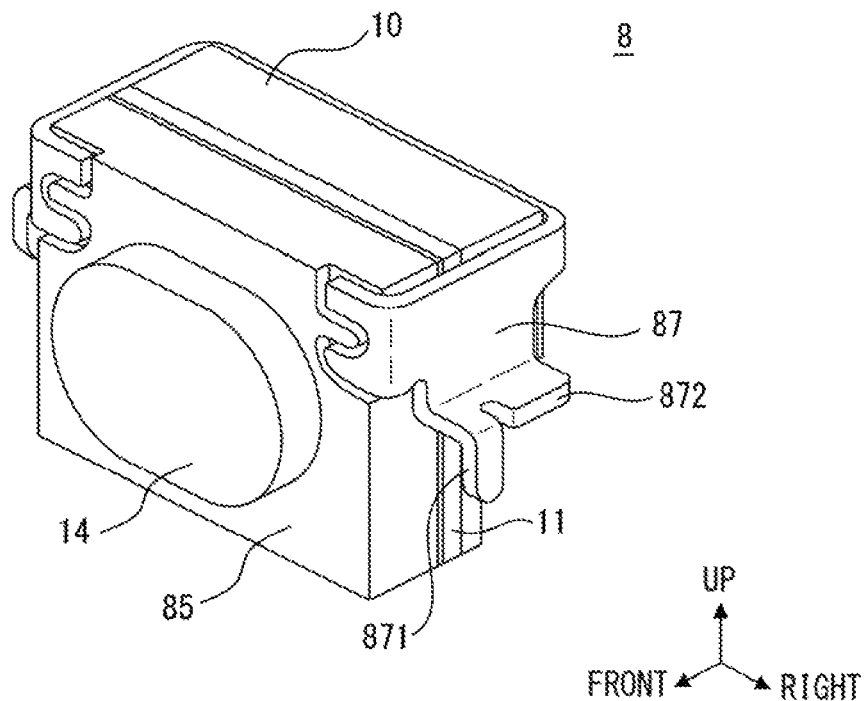
FIG. 15A is a perspective view illustrating a push switch 8 according to a fourth embodiment when viewed from the upper front right.
Figure 15B:
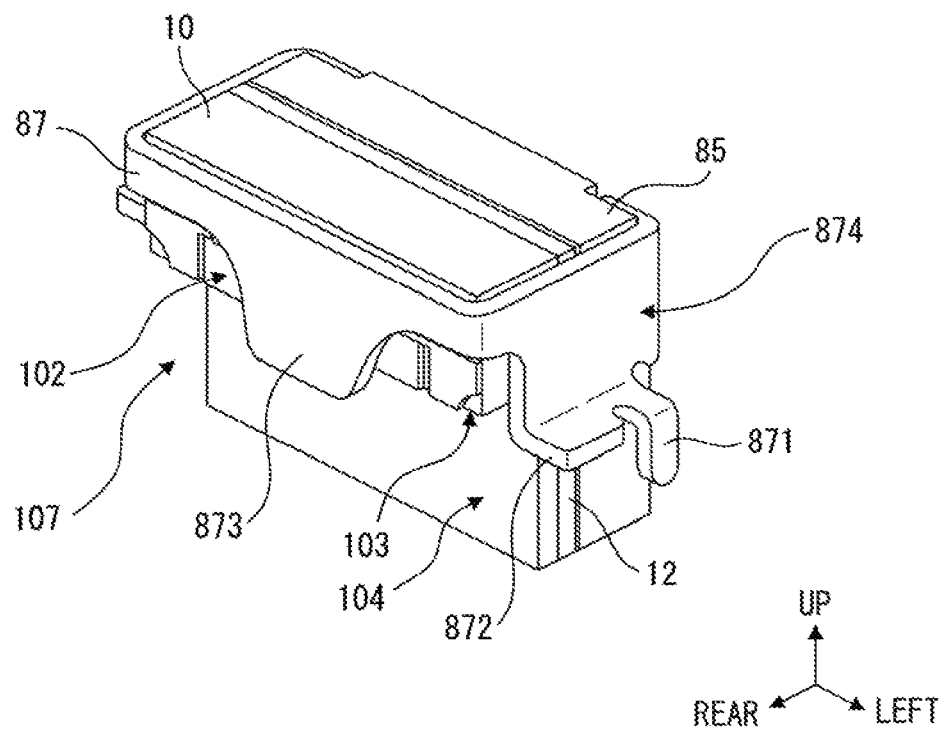
FIG. 15B is a perspective view illustrating the push switch 8 according to the fourth embodiment when viewed from the upper rear left.
Figure 16A:
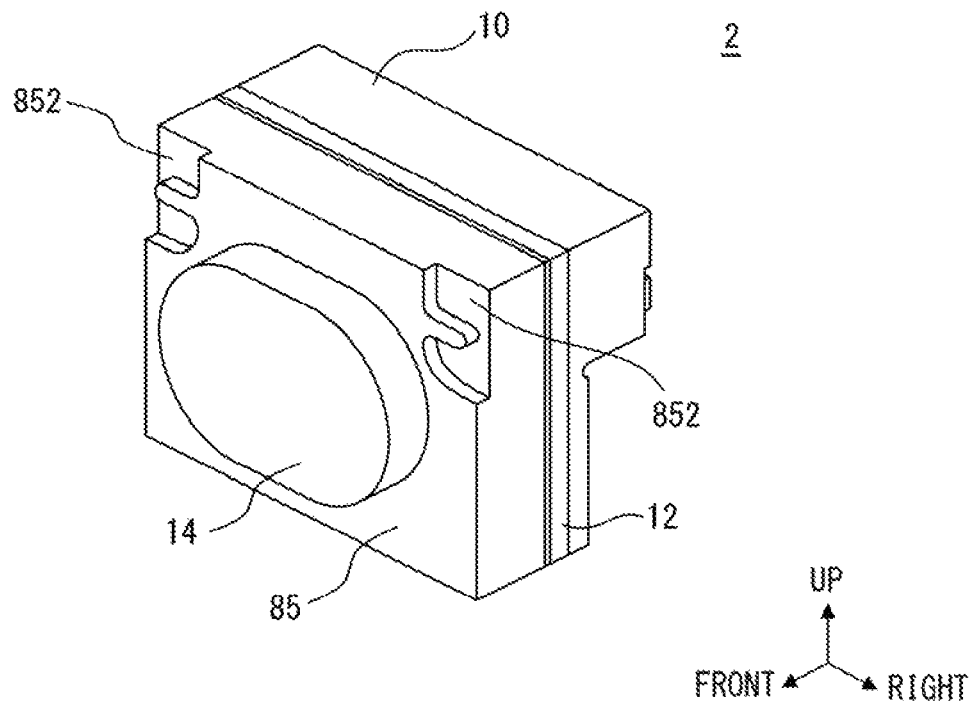
FIG. 16A is a perspective view illustrating the push switch 8 according to the fourth embodiment before a frame is attached, when viewed from the upper front right.
Figure 16B:
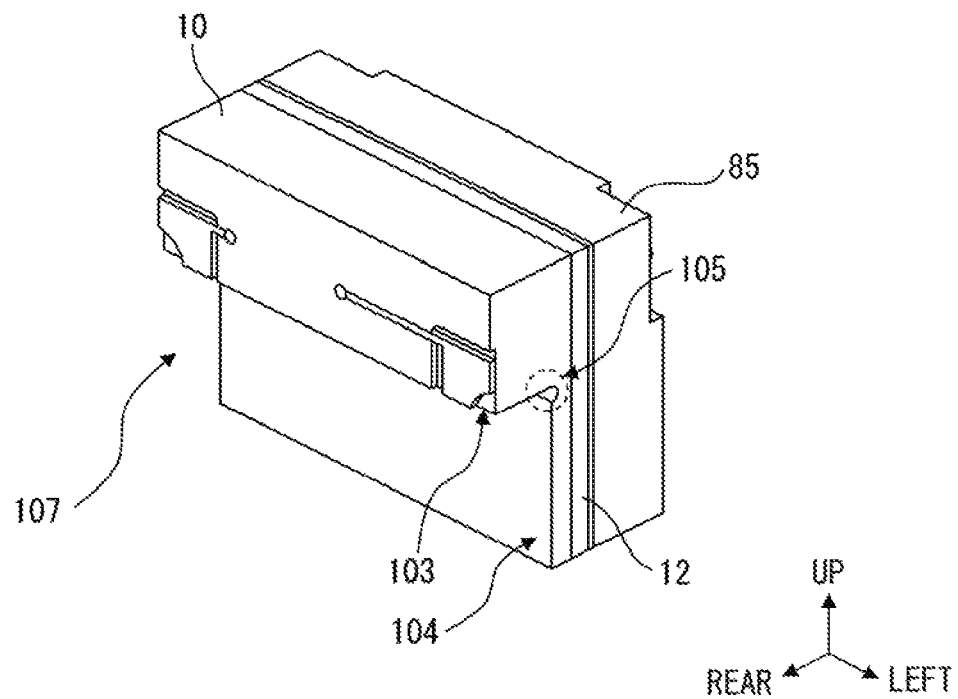
FIG. 16B is a perspective view illustrating the push switch 8 according to the fourth embodiment before the frame is attached, when viewed from the upper rear left.
Figure 17:
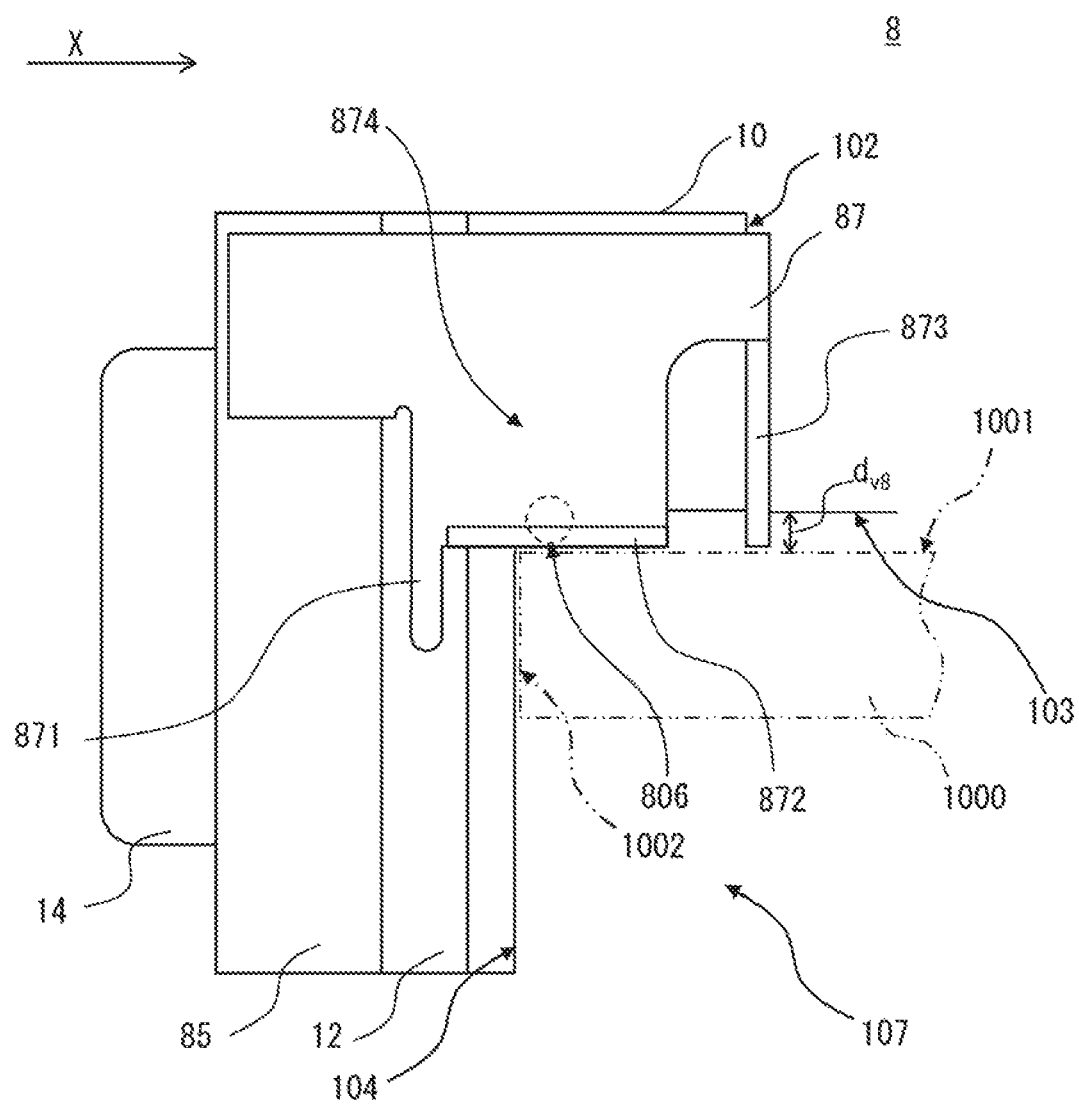
FIG. 17 is a side view illustrating the push switch 8 according to the fourth embodiment when viewed from the right of the front side.
Figure 18:
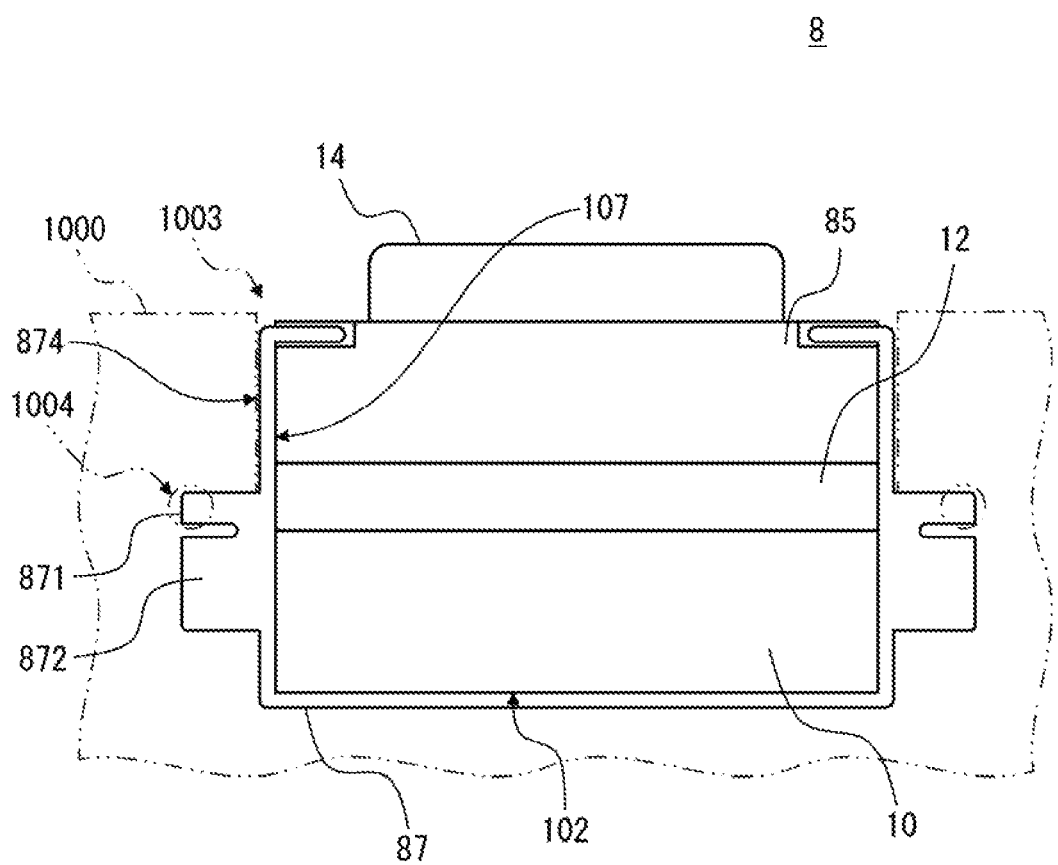
FIG. 18 is a top view illustrating the push switch 8 according to the fourth embodiment when viewed from above.

FIGS. 15A and 15B are perspective views illustrating a push switch 8 according to a fourth embodiment. FIG. 15A is a perspective view illustrating the push switch 8 when viewed from the upper front right, and FIG. 15B is a perspective view illustrating the push switch 8 when viewed from the upper rear left. FIGS. 16A and 16B are perspective views illustrating the push switch 8 according to the fourth embodiment before a frame is attached. FIG. 16A is a perspective view illustrating the push switch 8 when viewed from the upper front right, and FIG. 16B is a perspective view illustrating the push switch 8 when viewed from the upper rear left. FIG. 17 is a side view illustrating the push switch 8 according to the fourth embodiment when viewed from the right of the front side. FIG. 18 is a top view illustrating the push switch 8 according to the fourth embodiment when viewed from above.

The push switch 8 is different from the push switch 1 in that the former includes a case 85 instead of the case 15. The push switch 8 is further different from the push switch 1 in that the former includes a frame 87. Since the structures and functions of components constituting the push switch 8 other than the case 85 and the frame 87 are the same as those of components constituting the push switch 1 denoted by the same reference numerals, a detailed description thereof will not be given herein.

The case 85 is different from the case 15 in that a pair of fitting portions 852 are formed in the former. The pair of fitting portions 852 are recesses formed at the two ends of the upper side of the front surface of the case 85 to fit with the frame 87.

The frame 87 is formed by bending one metal sheet having a predetermined strength and elasticity. The frame 87 is fitted into the fitting portions 852 of the case 85 at its two ends and fixed. The frame 87 enters the second surface 102 a the substrate 10 from its two ends and holds the substrate 10, the spacer 12, the waterproof sheet 13, and the case 85 to clamp them.

The push switch 8 includes a frame 87 which holds the substrate 10, the spacer 12, the waterproof sheet 13, and the case 85 to clamp them. Hence, the push switch 8 can make the substrate 10, the spacer 12, the waterproof sheet 13, and the ease 85 less likely to fall off.

The frame 87 is in contact with the substrate 10 on the second surface 102 of the push switch 8. The frame 87 includes a side surface positioning portion 871 on a side surface 874 perpendicular to the second surface 102 and the third surface 103. The frame 87 further includes a side surface protrusion 872 formed on the side surface 874 and extending to separate from the substrate 10 parallel to the third surface 103. Side surface positioning portions 871 and side surface protrusions 872 are formed on left and right side surfaces 874 of the frame 87 to be symmetrical about the substrate 10. The frame 87 further includes a rear surface protrusion 873 protruding along the second surface 102.

The side surface protrusions 872 protrude downwards from the third surface 103 by $d_{v8}$, as illustrated in FIG. 17. The side surface positioning portions 871 also protrude downwards from the third surface 103 by at least $d_{v8}$, and the rear surface protrusion 873 protrudes downwards from the third surface 103 by $d_{v8}$.

The push switch 8 is placed in a notch 1003 formed by cutting an end of a mounting board 1000, so that the side surface protrusions 872 are in contact with a front surface 1001 of the mounting board 1000, as illustrated in FIG. 18. In this case, the side surface positioning portions 871 are inserted into engagement holes 1004 formed in the mounting board 1000. Therefore, the push switch 8 can be easily positioned with respect to the mounting board 1000 and mounted at a high strength.

Since the side surface protrusions 872 protrude downwards by $d_{v8}$, the third surface 103 of the push switch 8 is spaced apart from the front surface 1001 of the mounting board 1000 by $d_{v8}$, thus forming a groove 806 in the step 107.

Figure 19:
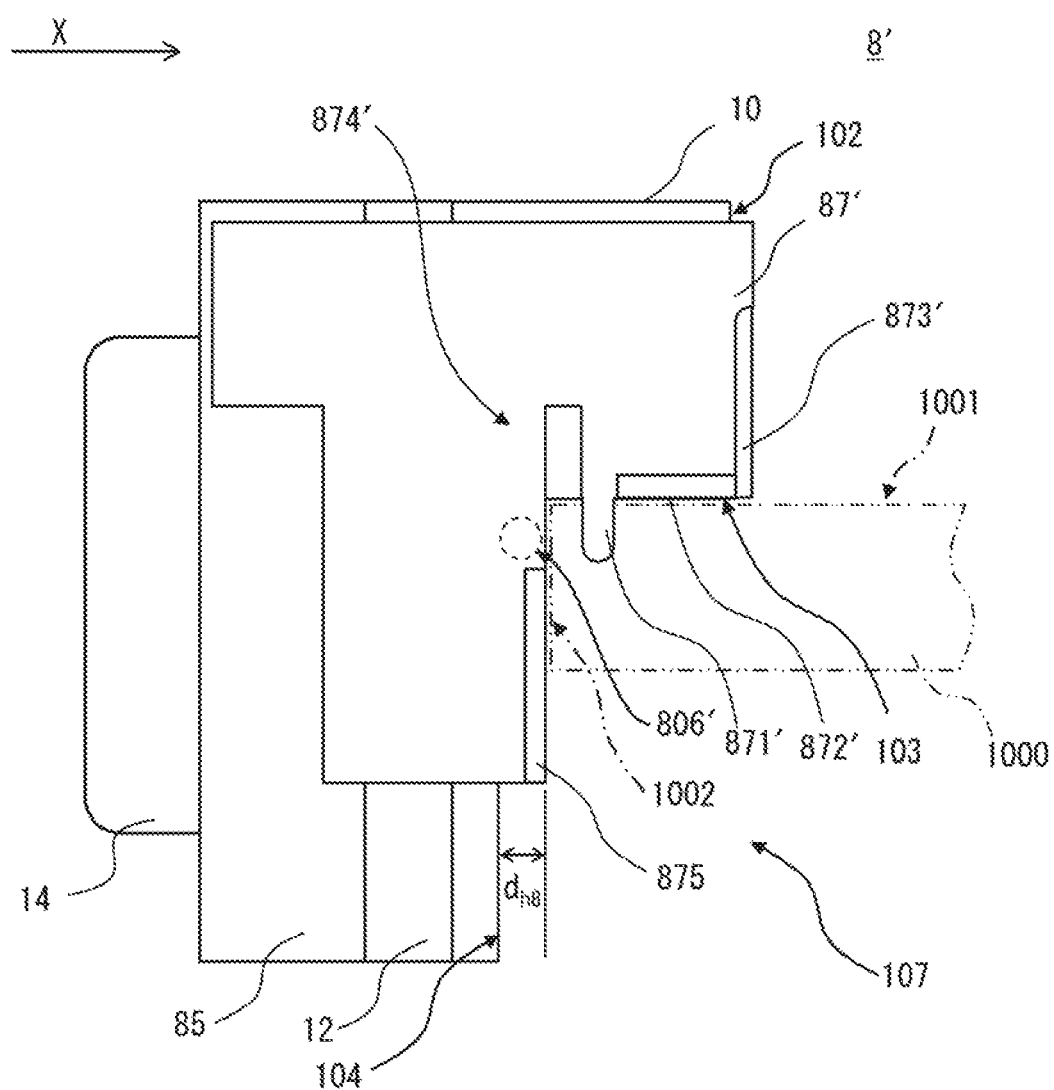
FIG. 19 is a side view illustrating a push switch 8' according to a modification to the fourth embodiment when viewed from the right of the front side.
Figure 20:
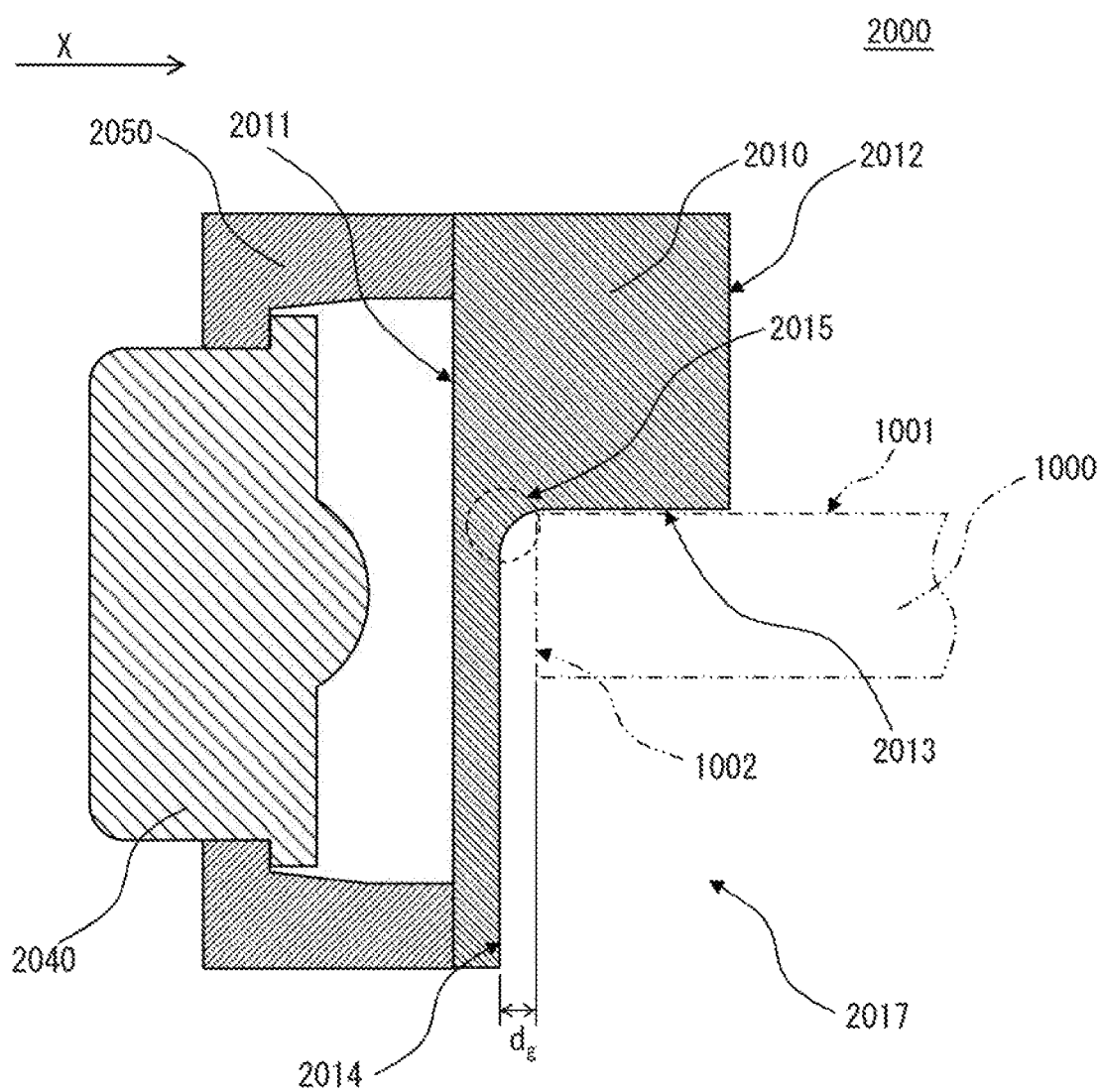
FIG. 20 is a schematic sectional view illustrating a push switch 2000 according to the conventional technique as mounted on a circuit board.

FIG. 19 is a side view illustrating a push switch 8' according to a modification to the fourth embodiment when viewed from the right of the front side.

The push switch 8' is different from the push switch 8 in that the former includes a frame 87' instead of the frame 87. Since the structures and functions of components constituting the push switch 8' other than the frame 87' are the same as those of components constituting the push switch 8 denoted by the same reference numerals, a detailed description thereof will not be given herein.

The frame 87' is afferent from the frame 87 in that the former includes side surface positioning portions 871' and side surface protrusions 872' instead of the side surface positioning portions 871 and the side surface protrusions 872. The frame 87' is further different from the frame 87 in that the former includes a second side surface protrusion 875 formed on a side surface 874' and extending to separate from the substrate 10 parallel to the fourth surface 104.

The side surface protrusions 872' do not protrude from the third surface 103. The second side surface protrusions 875 protrude from the fourth surface 104 in the direction indicated by an arrow X in FIG. 19 by $d_{h8}$.

Since the second side surface protrusions 875 protrude by $d_{h8}$, the fourth surface 104 of the push switch 8' is spaced apart from a side surface 1002 of a mounting board 1000 by $d_{h8}$, thus forming a groove 806' in the step 107.

A step is formed by cutting a substrate using a dicing saw in any of the above-described embodiments, but the push switch according to any of the embodiments may include a step formed by 3D printing or milling using an end mill or the like.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A push switch which is mountable on a mounting board, comprising:
    a substrate having a first surface on which a first fixed contact point and a second fixed contact point surrounding the first fixed contact point are formed, a second surface located opposite to the first surface, a third surface extending from the second surface to a corner in a direction perpendicular to the first surface, and a fourth surface extending from the corner parallel to the first surface; and
    a conductive movable contact point having a peripheral edge of the movable contact point which is in contact the second fixed contact point, and a center of the movable contact point contacted by the first fixed contact point when the movable contact point is pressed,
    wherein the third surface or the fourth surface is arranged so as to attach with the mounting board when the push switch is mounted on a mounting board, and
    wherein the corner has a groove recessed with respect to at least one of the third surface and the fourth surface, and the corner is located at a line of intersection between a front surface and a side surface of the mounting board when the push switch is mounted on the mounting board.

2. The push switch according to claim 1, wherein the groove is recessed with respect to the third surface.

3. The push switch according to claim 2, wherein the groove has a length from the fourth surface to the second surface larger than a depth of a recess of the groove from the third surface.

4. The push switch according to claim 1, wherein the groove is recessed with respect to the fourth surface.

5. The push switch according to claim 1, wherein the groove comprises a plurality of grooves, and the corner comprises the plurality of grooves along a line of intersection between the third surface and the fourth surface.

6. The push switch according to claim 1, further comprising a recess which is formed in a region of the fourth surface spaced apart from a line of intersection between the third surface and the fourth surface by not less than a predetermined distance and is recessed with respect to the fourth surface.

7. The push switch according to claim 1, wherein the third surface and the fourth surface is arranged so as to attach with the mounting board when the push switch is mounted on a mounting board.

* * * * *